(12) United States Patent
Matayoshi et al.

(10) Patent No.: US 11,884,804 B2
(45) Date of Patent: Jan. 30, 2024

(54) FOAM BODY, POLYOLEFIN-BASED FOAM SHEET, AND COMPLEX

(71) Applicant: Mitsui Chemicals, Inc., Tokyo (JP)

(72) Inventors: Tomoya Matayoshi, Ichihara (JP); Takayuki Watanabe, Chiba (JP); Michio Eriguchi, Chiba (JP); Satoshi Noma, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/481,627

(22) PCT Filed: Feb. 2, 2018

(86) PCT No.: PCT/JP2018/003610
§ 371 (c)(1),
(2) Date: Jul. 29, 2019

(87) PCT Pub. No.: WO2018/143411
PCT Pub. Date: Aug. 9, 2018

(65) Prior Publication Data
US 2019/0382572 A1 Dec. 19, 2019

(30) Foreign Application Priority Data

Feb. 2, 2017 (JP) ................................. 2017-017820
Nov. 14, 2017 (JP) ................................. 2017-219449

(51) Int. Cl.
*C08L 23/20* (2006.01)
*C08J 9/12* (2006.01)
*C08J 9/08* (2006.01)

(52) U.S. Cl.
CPC ............. *C08L 23/20* (2013.01); *C08J 9/08* (2013.01); *C08J 9/122* (2013.01); *C08J 2201/03* (2013.01); *C08J 2203/06* (2013.01); *C08J 2207/10* (2013.01); *C08J 2323/20* (2013.01); *C08L 2203/14* (2013.01)

(58) Field of Classification Search
CPC ..................................................... C08L 23/20
See application file for complete search history.

(56) References Cited

U.S. PATENT DOCUMENTS

| 6,077,878 | A | * | 6/2000 | Okura ..................... C08L 51/06 521/139 |
| 6,303,666 | B1 | | 10/2001 | Yorita et al. |
| 8,981,028 | B2 | | 3/2015 | Hustad |
| 9,410,009 | B2 | | 8/2016 | Hustad |
| 9,969,855 | B2 | * | 5/2018 | Williams ................ C08L 23/16 |
| 2004/0213983 | A1 | * | 10/2004 | Nodono .................... B32B 1/02 428/304.4 |
| 2006/0198983 | A1 | | 9/2006 | Patel |
| 2006/0199006 | A1 | | 9/2006 | Poon et al. |
| 2006/0199030 | A1 | | 9/2006 | Liang et al. |
| 2006/0199744 | A1 | | 9/2006 | Walton et al. |
| 2006/0199872 | A1 | | 9/2006 | Prieto et al. |
| 2006/0199884 | A1 | | 9/2006 | Hoenig et al. |
| 2006/0199887 | A1 | | 9/2006 | Liang et al. |
| 2006/0199896 | A1 | | 9/2006 | Walton et al. |
| 2006/0199897 | A1 | | 9/2006 | Karjala et al. |
| 2006/0199905 | A1 | | 9/2006 | Hughes et al. |
| 2006/0199906 | A1 | | 9/2006 | Walton et al. |
| 2006/0199907 | A1 | | 9/2006 | Chang et al. |
| 2007/0148432 | A1 | * | 6/2007 | Baker ....................... B32B 5/14 521/50 |
| 2008/0269419 | A1 | | 10/2008 | Hustad |
| 2011/0313072 | A1 | * | 12/2011 | Maurer ............... B29C 44/5627 521/146 |
| 2012/0094134 | A1 | * | 4/2012 | Enna ......................... C08J 5/18 428/474.7 |

(Continued)

FOREIGN PATENT DOCUMENTS

| EP | 2497789 A1 | 9/2012 |
| JP | S62256836 A | 11/1987 |

(Continued)

OTHER PUBLICATIONS

International Search Report (PCT/ISA/210) and translation and Written Opinion (PCT/ISA/237) dated May 15, 2018, by the Japanese Patent Office as the International Searching Authority for International Application No. PCT/JP2018/003610.

(Continued)

*Primary Examiner* — Irina Krylova
(74) *Attorney, Agent, or Firm* — BUCHANAN INGERSOLL & ROONEY PC

(57) ABSTRACT

A foam body constituted of a 4-methyl-1-pentene-based polymer, in which one or more temperatures showing a maximum value of loss tangent (tan δ) of dynamic viscoelasticity, which is obtained by dynamic viscoelasticity measurement conducted under the conditions of a temperature increase rate of 4° C./min, a frequency of 1.59 Hz, and a distortion of 0.1%, exist in at least a range of 10° C. or higher and 100° C. or lower, and the maximum value of the loss tangent is 0.5 or more and 3.5 or less. Another aspect relates to a polyolefin-based foam sheet constituted of a 4-methyl-1-pentene-based polymer, in which the difference in Shore A hardness of at least one surface at different times is defined. A further aspect relates to a complex including a foam body constituted of a 4-methyl-1-pentene-based polymer and a member which is bonded to the foam body and is different from the foam body.

5 Claims, No Drawings

(56) References Cited

U.S. PATENT DOCUMENTS

2012/0220728 A1* 8/2012 Uekusa ................ C08F 210/00
525/240
2014/0350189 A1 11/2014 Hustad

FOREIGN PATENT DOCUMENTS

| | | |
|---|---|---|
| JP | 2000290417 A | 10/2000 |
| JP | 2003100265 A | 4/2003 |
| JP | 2005145999 A | 6/2005 |
| JP | 2007529615 A | 10/2007 |
| JP | 2008533276 A | 8/2008 |
| JP | 2011228056 A | 11/2011 |
| JP | 2014084341 A | 5/2014 |
| JP | 2016132692 A | 7/2016 |
| JP | 2014001346 A | 1/2019 |
| WO | WO2015156890 * | 10/2015 |

OTHER PUBLICATIONS

Extended European Search Report dated Sep. 8, 2020, by the European Patent Office in corresponding European Application No. 18748686.5-1107, (7 pages).

* cited by examiner

FOAM BODY, POLYOLEFIN-BASED FOAM SHEET, AND COMPLEX

TECHNICAL FIELD

The present invention relates to a foam body, a polyolefin-based foam sheet, and a complex.

BACKGROUND ART

For example, since a foam body such as a polyolefin-based foam sheet is light in weight and is excellent in heat insulation and flexibility, the foam body is used as, for example, a shock absorbing material, a dish container, a heat insulating material, an automobile part, or the like.

As a technique regarding such a foam body, for example, a technique disclosed in Patent Document 1 (Japanese Laid-open Patent Publication No. 2014-084341) may be used.

Patent Document 1 discloses a polyolefin-based resin foam body obtained by extrusion-foaming a polyolefin-based resin composition for extrusion foaming including (a) a polyolefin-based resin, and (b) (b1) an elastomer and (b2) a plastomer, in which a mixing ratio of (a) and (b) is in a range of 90/10 to 10/90 by mass ratio, and a mixing ratio of (b1) and (b2) is in a range of 90/10 to 10/90 by mass ratio.

RELATED DOCUMENT

Patent Document

[Patent Document 1] Japanese Laid-open Patent Publication No. 2014-084341

SUMMARY OF THE INVENTION

Technical Problem

Generally, although a foam body is excellent in flexibility, the foam body cannot retain its shape in a case of changing the shape and is inferior in shape retainability and shape followability. Therefore, a member that is excellent in flexibility, shape retainability, and shape followability is not known.

A first invention of the present application is made in view of the above-mentioned circumstances and provides a member which is excellent in performance balance of flexibility, shape retainability, and shape followability.

In addition, generally, although a polyolefin-based foam sheet is excellent in flexibility, the foam sheet cannot retain its shape in a case of changing the shape and is inferior in shape retainability and shape followability. Therefore, a polyolefin-based foam sheet which is excellent in flexibility, shape retainability, and shape followability is not known.

A second invention of the present application is made in view of the above-mentioned circumstances and provides a polyolefin-based foam sheet which is excellent in performance balance of flexibility, shape retainability, and shape followability.

In addition, a foam body can be used in various applications by forming a complex by combining the foam body with a member that is different from the foam body. However, according to the investigation of the present inventors, it has become clear that a complex of a foam body of the related art and another member does not have a sufficiently satisfactory performance balance of flexibility and shape followability.

A third invention of the present application is made in view of the above-mentioned circumstances and provides a complex of a foam body and another member, which is excellent in performance balance of flexibility and shape followability.

Solution to Problem

The present inventors have conducted intensive investigations to realize a member excellent in flexibility, shape retainability, and shape followability. As a result, it has been found for the first time that a foam body showing a relatively high loss tangent (tan δ) in a range of 10° C. or higher and 100° C. or lower is excellent in performance balance of flexibility, shape retainability, and shape followability. As a result of conducting further intensive investigations by the present inventors based on the above-mentioned finding, the present inventors have found that it is possible to improve the performance balance of flexibility, shape retainability, and shape followability in the foam body constituted of a 4-methyl-1-pentene-based polymer by adjusting the temperature showing the maximum value of loss tangent (tan δ) and the maximum value of the loss tangent to specific ranges, and thus completed the first invention of the present application.

Moreover, the present inventors have conducted intensive investigations to achieve the object regarding the second invention of the present application. As a result, the present inventors have found that it is possible to improve the performance balance of flexibility, shape retainability, and shape followability in a polyolefin-based foam sheet using a 4-methyl-1-pentene-based polymer by setting a difference between a Shore A hardness immediately after measurement and a Shore A hardness after a certain period of time has passed since the measurement to be in a specific range, and thus completed the second invention of the present application.

Moreover, the present inventors have conducted intensive investigations to realize a complex of a foam body and another member, which is excellent in performance balance of flexibility and shape followability. As a result, the present inventors have found that it is possible to realize a complex excellent in performance balance of flexibility and shape followability by using a foam body constituted of a 4-methyl-1-pentene-based polymer as a foam body, and thus completed the third invention of the present application.

That is, according to the first invention of the present application, there are provided a foam body and a complex described below.

[1]
A foam body including:
a 4-methyl-1-pentene-based polymer,
in which one or more temperatures showing a maximum value of loss tangent (tan δ), which is obtained by dynamic viscoelasticity measurement conducted under conditions of a temperature increase rate of 4° C./min, a frequency of 1.59 Hz, and a distortion of 0.1%, exist in at least a range of 10° C. or higher and 100° C. or lower, and the maximum value of the loss tangent is 0.5 or more and 3.5 or less.

[2]
The foam body according to [1],
in which a density of the foam body is 0.10 g/cm$^3$ or more and 0.80 g/cm$^3$ or less.

[3]
The foam body according to [1] or [2], which is an uncrosslinked foam body.

[4]

The foam body according to any one of [1] to [3], in which a thickness of the foam body is in a range of 0.1 mm or more and 30 mm or less.

[5]

The foam body according to any one of [1] to [4], further including:
a foamable modified resin.

[6]

The foam body according to [5], in which a content of the foamable modified resin is 0.5% by mass or more and 50% by mass or less when the entire foam body is 100% by mass.

[7]

The foam body according to any one of [1] to [6], which is used for a member that may come into direct or indirect contact with a human body surface when used.

[8]

The foam body according to any one of [1] to [7], which is a foam body selected from the group consisting of an injection molded body, an extrusion molded body, a vacuum molded body, a blow molded body, a press molded body, a pressure molded body, a calender molded body, a bead molded body, and a batch foam body.

[9]

The foam body according to any one of [1] to [8], which is a foam body selected from the group consisting of fibers, monofilaments, strands, bands, films, sheets, hoses, tubes, tapes, flat yarns, pipes, spheres, polyhedrons and mesh structures.

[10]

The foam body according to any one of [1] to [9], further including:
a vent hole.

[11]

A complex including:
the foam body according to any one of [1] to [10]; and a member which is bonded to the foam body and is different from the foam body.

[12]

The complex according to [11], in which the member different from the foam body includes one or two or more selected from the group consisting of woven fabrics, non-woven fabrics, synthetic fibers, artificial leathers, synthetic leathers, natural leathers, furs, metals, carbon materials, rubbers, thermoplastic elastomers, thermoplastic resins, thermosetting resins, polymer foam bodies, mesh structures, fiber reinforced plastics, papers, woods, glass, stones, and ceramics.

[13]

The complex according to [11] or [12] further including:
an adhesive between the foam body and the member.

In addition, according to the second invention of the present application, there are provided a polyolefin-based foam sheet and a complex.

[14]

A polyolefin-based foam sheet including:
a 4-methyl-1-pentene-based polymer,
in which when a Shore A hardness of at least one surface of the polyolefin-based foam sheet immediately after measurement, which is measured at 23° C. according to JIS K 6253, is $HS_0$, and a Shore A hardness 15 seconds after the measurement is $HS_1$,
ΔHS expressed by ($HS_0$–$HS_1$) is 30 or more and 60 or less.

[15]

The polyolefin-based foam sheet according to [14], in which a maximum peak height (Rp) of at least one surface of the polyolefin-based foam sheet, which is measured according to JIS B0601:2001, is 190 μm or less.

[16]

The polyolefin-based foam sheet according to [14] or [15],
in which the Shore A hardness ($HS_0$) of at least one surface of the polyolefin-based foam sheet immediately after measurement, which is measured at 23° C. according to JIS K 6253, is 85 or less.

[17]

The polyolefin-based foam sheet according to any one of [14] to [16],
in which a melt tension of the polyolefin-based foam sheet at 180° C. is 10 mN or more and 1000 mN or less.

[18]

The polyolefin-based foam sheet according to any one of [14] to [17],
in which a density of the polyolefin-based foam sheet is 0.10 g/cm$^3$ or more and 0.80 g/cm$^3$ or less.

[19]

The polyolefin-based foam sheet according to any one of [14] to [18], which is an uncrosslinked sheet.

[20]

The polyolefin-based foam sheet according to any one of [14] to [19],
in which the 4-methyl-1-pentene-based polymer includes a constitutional unit derived from 4-methyl-1-pentene, and a constitutional unit derived from an α-olefin having 2 to 20 carbon atoms other than 4-methyl-1-pentene.

[21]

The polyolefin-based foam sheet according to any one of [14] to [20],
in which a thickness of the polyolefin-based foam sheet is 0.1 mm or more and 30 mm or less.

[22]

The polyolefin-based foam sheet according to any one of [14] to [21], further including:
a foamable modified resin.

[23]

The polyolefin-based foam sheet according to [22], in which a content of the foamable modified resin is 0.5% by mass or more and 50% by mass or less when the entire polyolefin-based foam sheet is 100% by mass.

[24]

The polyolefin-based foam sheet according to any one of [14] to [23],
in which one or more temperatures showing a maximum value of loss tangent (tan δ) of dynamic viscoelasticity exist in at least a range of 10° C. or higher and 40° C. or lower, and the maximum value of the loss tangent is 0.8 or more and 3 or less.

[25]

The polyolefin-based foam sheet according to any one of [14] to [24], which is used for a member that may come into direct or indirect contact with a human body surface when used.

[26]

A complex comprising:
the polyolefin-based foam sheet according to any one of [14] to [25]; and
a member which is bonded to the polyolefin-based foam sheet and is different from the polyolefin-based foam sheet.

[27]

The complex according to [26], in which the member different from the polyolefin-based foam sheet includes one or two or more selected from the group consisting of woven fabrics, non-woven fabrics, synthetic fibers, artificial leathers, synthetic leathers, natural leathers, furs, metals, carbon materials, rubbers, thermoplastic elastomers, thermoplastic resins, thermosetting resins, polymer foam bodies, mesh structures, fiber reinforced plastics, papers, woods, glass, stones, and ceramics.

[28]

The complex according to [26] or [27], further including:

an adhesive between the polyolefin-based foam sheet and the member.

In addition, according to the third invention of the present application, there is provided a complex shown below.

[29]

A complex comprising:

a foam body constituted of a 4-methyl-1-pentene-based polymer; and a member which is bonded to the foam body and is different from the foam body.

[30]

The complex according to [29], in which the member different from the foam body includes one or two or more selected from the group consisting of woven fabrics, non-woven fabrics, synthetic fibers, artificial leathers, synthetic leathers, natural leathers, furs, metals, carbon materials, rubbers, thermoplastic elastomers, thermoplastic resins, thermosetting resins, polymer foam bodies, mesh structures, fiber reinforced plastics, papers, woods, glass, stones, and ceramics.

[31]

The complex according to [29] or [30], further including:

an adhesive between the foam body and the member.

Advantageous Effects of Invention

According to the first invention of the present application, it is possible to realize a member excellent in performance balance of flexibility, shape retainability, and shape followability.

According to the second invention of the present application, it is possible to realize a polyolefin-based foam sheet excellent in performance balance of flexibility, shape retainability, and shape followability.

According to the third invention of the present application, it is possible to realize a complex of a foam body and another member, which is excellent in performance balance of flexibility and shape followability.

DESCRIPTION OF EMBODIMENTS

Hereinafter, embodiments of the present invention will be described. Unless otherwise specified, a numerical range "A to B" means being equal to or more than A and equal to or less than B.

1. First Invention

<Foam Body (A)>

A foam body (A) according to a first invention is a foam body constituted of a 4-methyl-1-pentene-based polymer (a1), and one or more temperatures showing a maximum value of loss tangent (tan δ), which is obtained by dynamic viscoelasticity measurement conducted under the conditions of a temperature increase rate of 4° C./min, a frequency of 1.59 Hz, and a distortion of 0.1%, exist in at least a range of 10° C. or higher and 100° C. or lower, and the maximum value of the loss tangent is 0.5 or more and 3.5 or less.

As described above, generally, although a foam body is excellent in flexibility, the foam body cannot retain its shape in a case of changing the shape and is inferior in shape retainability and shape followability. Therefore, a member that is excellent in flexibility, shape retainability, and shape followability is not known.

The present inventors have conducted intensive investigations to realize a member excellent in flexibility, shape retainability, and shape followability. As a result, it has been found for the first time that a foam body showing a relatively high loss tangent (tan δ) in a range of 10° C. or higher and 100° C. or lower is excellent in performance balance of flexibility, shape retainability, and shape followability.

As a result of conducting further intensive investigations by the present inventors based on the above-mentioned finding, the present inventors have been found that it is possible to improve the performance balance of flexibility, shape retainability, and shape followability in the foam body constituted of a 4-methyl-1-pentene-based polymer by adjusting the temperature showing the maximum value of the loss tangent (tan δ) and the maximum value of the loss tangent to specific ranges, and thus completed the first invention of the present application.

Although the reason why the foam body (A) in which the maximum value of the loss tangent in a range of 10° C. or higher and 100° C. or lower is in the above range is excellent in performance balance of flexibility, shape retainability, and shape followability is not clear, the following reasons can be considered.

First, since a large amount of the mechanical energy given during deformation can be converted to thermal energy, and a large of the energy can be absorbed, the restoration rate of the foam body (A) in which the maximum value of the loss tangent in a range of 10° C. or higher and 100° C. or lower is in the above range after deformation is considered to be slow. As a result, it is considered that while maintaining the flexibility of the foam body, it is possible to retain the shape after deformation satisfactorily or to follow the deformation satisfactorily.

As mentioned above, according to this embodiment, the member which is excellent in performance balance of flexibility, shape retainability, and shape followability can be realized.

The shape of the foam body (A) according to the embodiment is not particularly limited, and examples thereof include a fiber, a monofilament, a strand, a band, a film, a sheet, a hose, a tube, a tape, a flat yarn, a pipe, a sphere, a polyhedron, and a mesh structure. Among these, a film or a sheet is preferable.

Here, in a case where the shape of the foam body (A) is a flat shape such as a band, a film, a sheet, a tape, or a flat yarn, the loss tangent (tan δ) which is obtained by dynamic viscoelasticity measurement can be measured by, for example, cutting the foam body into a test piece having a size of 30 mm length×10 mm width and using a rheometer under conditions of a frequency of 1.59 Hz, a temperature increase rate of 4° C./min, a measurement temperature range of 0° C. to 110° C., a distortion of 0.1%, and a chuck distance of 20 mm in a twist mode.

In addition in a case where the shape of the foam body (A) is a threadlike shape such as a fiber, a monofilament, or a strand, the loss tangent (tan δ) which is obtained by dynamic viscoelasticity measurement can be measured by, for example, using a rheometer under conditions of a frequency of 1.59 Hz, a temperature increase rate of 4° C./min, in a measurement temperature range of 0° C. to 110° C., and a distortion of 0.1% in a tension mode.

In addition, in a case where the shape of the foam body (A) is a three-dimensional shape such as a hose, a tube, a pipe, a sphere, a polyhedron, or a mesh structure, the loss tangent (tan δ) which is obtained by dynamic viscoelasticity measurement can be measured by, for example, cutting the foam body into a test piece having a predetermined size as required, and using a rheometer under conditions of a frequency of 1.59 Hz, a temperature increase rate of 4° C./min, a measurement temperature range of 0° C. to 110° C., and a distortion of 0.1% in a tension mode or compression mode.

In the embodiment, for example, by appropriately adjusting (1) the kind and the mixing ratio of the 4-methyl-1-pentene-based polymer (a1) constituting the foam body (A), (2) whether or not the foam body (A) is crosslinked, and (3) a foam molding method or the like, the maximum value of the loss tangent in a range of 10° C. to 100° C. can be controlled to be in the above range.

Among these, for example, increasing the mixing ratio of the 4-methyl-1-pentene-based polymer (a1) in the foam body (A), not conducting crosslinking treatment on the foam body (A), and the like may be factors for setting the maximum value of the loss tangent in a range of 10° C. to 100° C. to the desired numerical range.

The foam body (A) according to the embodiment is preferably uncrosslinked from the viewpoint of improving shape retainability and shape followability. That is, for example, the foam body (A) according to the embodiment is preferably an uncrosslinked foam body which is not subjected to a crosslinking treatment such as ionizing radiation crosslinking using an electron beam and a γ-ray. Thus, the maximum value of the loss tangent in a range of 10° C. to 100° C. can be increased and a foam body (A) which is more excellent in shape retainability and shape followability can be obtained.

The density of the foam body (A) according to the embodiment is preferably 0.80 $g/cm^3$ or less, more preferably 0.75 $g/cm^3$ or less, still more preferably 0.70 $g/cm^3$ or less, and particularly preferably 0.65 $g/cm^3$ or less. In a case where the density is equal to or less than the upper limit, a lighter foam body (A) can be obtained, the blocking resistance of the foam body (A) can be improved or the smoothness of the surface can be improved, and as a result, the touch feeling can be improved.

In addition, the density of the foam body (A) is preferably 0.10 $g/cm^3$ or more, more preferably 0.20 $g/cm^3$ or more, still more preferably 0.30 $g/cm^3$ or more, and particularly preferably 0.40 $g/cm^3$ or more. In a case where the density is equal to or more than the lower limit, the mechanical properties, such as bending properties and tensile properties, of the foam body (A) can be further improved.

The density of the foam body (A) according to the embodiment can be controlled to be in the above range by appropriately controlling, for example, the kind or mixing amount of the 4-methyl-1-pentene-based polymer (a1) or a foamable modified resin (a2) described later, the expansion ratio of the foam body (A), and the like, respectively.

In the foam body (A) according to the embodiment, the temperature showing the maximum value of the loss tangent (tan δ) of dynamic viscoelasticity is preferably at least one temperature in at least a range of 10° C. or higher and 80° C. or lower, more preferably one or more temperatures in a range of 10° C. or higher and 60° C. or lower, still more preferably one or more temperatures in a range of 10° C. or higher and 50° C. or lower, and particularly preferably one temperature in a range of 10° C. or higher and 50° C. or lower.

In addition, in the foam body (A) according to the embodiment, the maximum value of the loss tangent is preferably 0.8 or more, more preferably 1.0 or more, and still more preferably 1.2 or more. In the foam body (A) according to the embodiment, the maximum value of the loss tangent is preferably 3.0 or less and more preferably 2.8 or less.

Thus, the performance balance of flexibility, shape retainability, and shape followability of the foam body (A) according to the embodiment can be further improved. Here, as the maximum value of the loss tangent increases, the viscous properties of the foam body becomes stronger.

Although the reason why the foam body (A) having strong viscous properties is more excellent in performance balance of flexibility, shape retainability, and shape followability is not clear, the following reasons can be considered.

First, since a larger amount of the mechanical energy given during deformation can be converted to thermal energy, and a larger of the energy can be absorbed, the restoration rate of the foam body (A) having strong viscous properties after deformation is considered to be slower. As a result, it is considered that while maintaining the flexibility of the foam body, it is possible to retain the shape after deformation more satisfactorily or to follow the deformation more satisfactorily.

The thickness of the foam body (A) according to the embodiment is not particularly limited and for example, the thickness is in a range of 0.1 mm or more and 30 mm or less, preferably in a range of 0.2 mm or more and 20 mm or less, and more preferably in a range of 0.3 mm or more and 12 mm or less. In a case where the thickness of the foam body (A) according to the embodiment is in this range, the balance of flexibility, shape retainability, shape followability, lightness, mechanical properties, handleability, appearance, moldability, moisture resistance, and the like is more excellent.

Hereinafter, each component constituting the foam body (A) according to the embodiment will be described.

4-Methyl-1-Pentene-Based Polymer (a1)

The foam body (A) according to the embodiment includes a 4-methyl-1-pentene-based polymer (a1) as an essential component. Thus, the maximum value of the loss tangent (tan δ) can be further increased.

As the 4-methyl-1-pentene-based polymer (a1) according to the embodiment, for example, a 4-methyl-1-pentene·α-olefin copolymer (c) including a constitutional unit (c1) derived from 4-methyl-1-pentene, and a constitutional unit (c2) derived from an α-olefin having 2 to 20 carbon atoms other than 4-methyl-1-pentene may be exemplified.

Here, in the present embodiment, "an α-olefin having 2 to 20 carbon atoms" does not include 4-methyl-1-pentene unless otherwise specified.

In the 4-methyl-1-pentene·α-olefin copolymer (c) according to the embodiment, from the viewpoint of further improving the flexibility of the foam body (A), when the total of the constitutional unit (c1) and the constitutional unit (c2) is 100 mol %, it is preferable that the content of the constitutional unit (c1) is 10 mol % or more and 90 mol % or less and the content of the constitutional unit (c2) is 10 mol % or more and 90 mol % or less.

In addition, in the 4-methyl-1-pentene·α-olefin copolymer (c) according to the embodiment, from the viewpoint of further improving the flexibility and the mechanical properties of the foam body (A), when the total of the constitutional unit (c1) and the constitutional unit (c2) is 100 mol %, it is more preferable that the content of the constitutional unit (c1) is 30 mol % or more and 90 mol % or less, and the content of the constitutional unit (c2) is 10 mol % or more and 70 mol % or less, it is still more preferable that the content of the constitutional unit (c1) is 50 mol % or more and 90 mol % or less, and the content of the constitutional unit (c2) is 10 mol % or more and 50 mol % or less, it is even still more preferable that the content of the constitutional unit (c1) is 60 mol % or more and 90 mol % or less, and the content of the constitutional unit (c2) is 10 mol % or more and 40 mol % or less, and it is particularly preferable that the content of the constitutional unit (c1) is 65 mol % or more and 90 mol % or less, and the content of the constitutional unit (c2) is 10 mol % or more and 35 mol % or less.

In the embodiment, examples of the α-olefin having 2 to 20 carbon atoms which is used for the 4-methyl-1-pentene·α-olefin copolymer (c) include a linear or branched α-olefin, a cyclic olefin, an aromatic vinyl compound, a conjugated diene, and a functionalized vinyl compound, and a linear α-olefin is preferable.

The number of carbon atoms in the linear α-olefin is preferably 2 to 10 and more preferably 2 or 3. Examples of the linear α-olefin include ethylene, propylene, 1-butene, 1-pentene, 1-hexene, 1-octene, 1-decene, 1-undesen, 1-dodecene, 1-tetradecene, 1-hexadecene, 1-octadecene, and 1-eicosene. One or two or more selected from ethylene, propylene, 1-butene, 1-pentene, 1-hexene, 1-octene, and 1-decene are preferable and at least one selected from ethylene and propylene is more preferable.

The number of carbon atoms in the branched α-olefin is preferably 5 to 20 and more preferably 5 to 15. Examples of the branched α-olefin include 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene.

The number of carbon atoms in the cyclic olefin is preferably 5 to 15. Examples of the cyclic olefin include cyclopentene, cyclohexene, cycloheptene, norbornene, 5-methyl-2-norbornene, tetracyclododecene, and vinylcyclohexane.

Examples of the aromatic vinyl compound include styrene, and mono- or polyalkylstyrene such as α-methylstyrene, o-methylstyrene, m-methylstyrene, p-methylstyrene, o,p-dimethylstyrene, o-ethylstyrene, m-ethylstyrene, and p-ethylstyrene.

The number of carbon atoms in the conjugated diene is preferably 4 to 20 and more preferably 4 to 10. Examples of the conjugated diene include 1,3-butadiene, isoprene, chloroprene, 1,3-pentadiene, 2,3-dimethylbutadiene, 4-methyl-1,3-pentadiene, 1,3-hexadiene, and 1,3-octadiene.

Examples of the functionalized vinyl compound include hydroxyl group-containing olefins; halogenated olefins; unsaturated carboxylic acids such as (meth)acrylic acid, propionic acid, 3-butenoic acid, 4-pentenoic acid, 5-hexenoic acid, 6-heptenoic acid, 7-octenoic acid, 8-nonenoic acid, 9-decenoic acid, and 10-undecenoic acid, and acid anhydrides thereof, unsaturated amines such as acid halide, allylamine, 5-hexenamine, 6-heptenamine, unsaturated acid anhydrides such as (2,7-octadienyl)succinic anhydride, pentapropenylsuccinic anhydride, unsaturated epoxy compounds, and ethylenically unsaturated silane compounds.

Examples of the hydroxyl group-containing olefin include linear or branched terminal-hydroxylated α-olefins having 2 to 20, preferably 2 to 15, carbon atoms.

Examples of the halogenated olefin include linear or branched halogenated α-olefins having 2 to 20, preferably 2 to 15, carbon atoms.

These α-olefins having 2 to 20 carbon atoms may be used alone or in combination of two or more thereof. Among these, ethylene and propylene are suitable, and propylene is particularly preferably used from the viewpoint of being capable of further improving flexibility or the like.

The 4-methyl-1-pentene·α-olefin copolymer (c) may include other constitutional units in addition to the constitutional units (c1) and (c2) within the range not impairing the object of the present invention. Other constitutions include constitutional units derived from non-conjugated polyenes.

Examples of the non-conjugated polyene include linear or branched cyclic dienes having preferably 5 to 20, more preferably 5 to 10, carbon atoms, various norbornes, and norbornadienes. Among these, 5-vinylidene-2-norbornene and 5-ethylidene-2-norbornene are preferable.

The intrinsic viscosity [η] of the 4-methyl-1-pentene-based polymer according to the embodiment at 135° C. in decalin is preferably 0.01 to 5.0 dL/g, more preferably 0.1 to 4.0 dL/g, still more preferably 0.5 to 3.0 dL/g, and particularly preferably 1.0 to 2.8 dL/g from the viewpoint of further improving the flexibility and the mechanical strength of the foam body (A).

The density of the 4-methyl-1-pentene-based polymer according to the embodiment measured according to ASTM D 1505 (water substitution) is preferably 0.810 to 0.850 g/cm$^3$, more preferably 0.820 to 0.850 g/cm$^3$, and still more preferably 0.830 to 0.850 g/cm$^3$.

The 4-methyl-1-pentene-based polymer according to the embodiment can be produced by various methods. For example, the 4-methyl-1-pentene-based polymer can be produced using known catalysts such as magnesium-supported titanium catalysts; metallocene catalysts described in International Publication No. WO 01/53369, International Publication No. WO 01/027124, Japanese Laid-open Patent Publication No. H03-193796, and Japanese Laid-open Patent Publication No. H02-41303; and metallocene compound-containing olefin polymerization catalysts described in International Publication No. WO 2011/055803.

The content of the 4-methyl-1-pentene-based polymer (a1) in the foam body (A) according to the embodiment is not particularly limited. When the entire foam body (A) is 100% by mass, the content of the 4-methyl-1-pentene-based polymer is preferably 50% by mass or more, more preferably 60% by mass or more, still more preferably 65% by mass or more, even still more preferably 70% by mass or more, and particularly preferably 75% by mass or more. The content of the 4-methyl-1-pentene-based polymer is preferably 100% by mass or less, more preferably 99.5% by mass or less, still more preferably 99% by mass or less, even still more preferably 98% by mass or less, and particularly preferably 97% by mass or less.

Thus, it is possible to obtain a foam body (A) which is more excellent in balance of flexibility, shape retainability, shape followability, lightness, mechanical properties, handleability, appearance, moldability, moisture resistance, and the like.

<Foamable Modified Resin (a2)>

The foam body (A) according to the embodiment preferably contains the foamable modified resin (a2) (however, excluding the 4-methyl-1-pentene-based polymer (a1) according to the embodiment) from the viewpoint of further improving appearance, a touch feeling, foamability (for example, expansion ratio, cell density), and the like.

The foamable modified resin (a2) according to the embodiment is not particularly limited as long as the resin improves the foamability of the foam body (A). For example, at least one selected from thermoplastic resins, thermoplastic elastomers, and rubbers is preferable.

Examples of the thermoplastic resins (however, excluding the 4-methyl-1-pentene-based polymer (a1) according to the embodiment) include thermoplastic polyolefin resins such as low density polyethylene, mediumdensitypolyethylene, high density polyethylene, high pressure low density polyethylene, polypropylene, poly 1-butene, poly 4-methyl-1-pentene, poly 3-methyl-1-butene, ethylene·α-olefin copolymers, propylene·α-olefin copolymers, 1-butene·α-olefin copolymers, cyclic olefin copolymers, and chlorinated polyolefin; thermoplastic polyamide-based resins such as aliphatic polyamides (such as nylon 6, nylon 11, nylon 12, nylon 66, nylon 610, and nylon 612), and polyether block amide copolymers; thermoplastic polyester-based resins such as polyethylene terephthalate and polybutylene terephthalate; thermoplastic vinyl aromatic resins such as polystyrene, ABS resin, and AS resin; vinyl chloride resin; vinylidene chloride resin; acryl resin; ethylene·vinyl acetate copolymers; ethylene·methacrylic acid acrylate copolymer; ionomers; ethylene·vinyl alcohol copolymers; polyvinyl alcohols; fluorine-based resins such as polyvinyl fluoride resin, polytetrafluoroethylene, polyvinylidene fluoride, and ETFE; polycarbonates; polyacetals; polyphenylene oxides; polyphenylene sulfides; polyimides; polyarylates; polysulfones; polyether sulfones; rosin-based resins; terpene-based resins; and petroleum resins.

Examples of the rubbers include ethylene·α-olefin·diene copolymer rubber, propylene·α-olefin·diene copolymer rubber, 1-butene·α-olefin·diene copolymer rubber, polybutadiene rubber, polyisoprene rubber, neoprene rubber, nitrile rubber, butyl rubber, polyisobutylene rubber, natural rubbers, and silicone rubber.

Further, examples of the thermoplastic elastomers include olefin-based elastomers, styrene-based elastomers, acid-modified styrene-based elastomers, vinyl chloride-based elastomers, urethane-based elastomers, ester-based elastomers, and amide-based elastomers.

In addition, these foamable modified resins (a2) may be acid-modified with acrylic acid, methacrylic acid, maleic acid, and the like.

These foamable modified resins (a2) may be used alone or in combination of two or more thereof.

Among these foamable modified resins (a2), one or two or more selected from low density polyethylene, medium density polyethylene, high density polyethylene, high pressure low density polyethylene, polypropylene, poly 1-butene, poly 4-methyl-1-pentene, poly 3-methyl-1-butene, ethylene·α-olefin copolymers, propylene·α-olefin copolymers, 1-butene·α-olefin copolymers, polyether block amide copolymers, ethylene·vinyl acetate copolymers, ethylene·methacrylic acid acrylate copolymers, ionomers, fluorine-based resins, acid-modified fluorine-based resins, rosin-based resins, terpene-based resins, and petroleum resins are preferable, and one or two or more, which are selected from polyethylene, polypropylene, poly 1-butene, poly 4-methyl-1-pentene, ethylene·α-olefin copolymers, propylene·α-olefin copolymers, 1-butene·α-olefin copolymers, an ethylene·vinyl acetate copolymer, polyether block amides, ionomers, fluorine-based resins, acid-modified fluorine-based resins, rosin-based resin, terpene-based resins, petroleum resins, and styrene-based elastomers, and improves melt tension by being added, are more preferable.

In addition, it is still more preferable that the resin is appropriately compatible with the 4-methyl-1-pentene-based polymer (a1) according to the embodiment. Further, among the styrene-based elastomers, vinyl SIS (product name: HYBRAR, brand: 5127) and vinyl SEPS (product name: HYBRAR, brand: 7125) manufactured by Kuraray Co., Ltd. and SEBS (product name: S.O.E, brand: S1605, S1611, and L609) manufactured by Asahi Kasei Co., Ltd. can be preferably used from the viewpoint of compatibility, the temperature range showing maximum value of loss tangent, and the size of maximum value of loss tangent.

In the foam body (A) according to the embodiment, these foamable modified resins (a2) may be used alone or in combination of two or more thereof.

The content of the foamable modified resin (a2) in the foam body (A) according to the embodiment is not particularly limited. When the entire foam body (A) is 100% by mass, the content of the foamable modified resin is preferably 0.5% by mass or more, more preferably 1% by mass or more, still more preferably 2% by mass or more, and even still more preferably 3% by mass or more. The content of the foamable modified resin is preferably 50% by mass or less, more preferably 40% by mass or less, still more preferably 35% by mass or less, even still more preferably 30% by mass or less, and particularly preferably 25% by mass or less.

In a case where the content of the foamable modified resin (a2) is equal to or more than the lower limit, the appearance, touch feeling, and foamability (for example, expansion ratio, cell density) of the foam body (A) according to the embodiment can be further improved. In a case where the content of the foamable modified resin (a2) is equal to or less than the upper limit, the performance balance of flexibility, shape retainability, and shape followability of the foam body (A) according to the embodiment can be further improved.

<Other Components>

The foam body (A) according to the embodiment may be mixed with additives such as a heat-resistant stabilizer, an antioxidant, an ultraviolet absorber, a pigment, an antistatic agent, a copper inhibitor, a flame retardant, a neutralizing agent, a foaming agent, a plasticizer, a nucleating agent, an antifoaming agent, a weathering stabilizer, a light resistance stabilizer, an antiaging agent, a fatty acid metal salt, a softener, a dispersing agent, a coloring agent, a lubricant, natural oil, synthetic oil, and wax as required. Among these, particularly, a plasticizer, a softener, natural oil, and synthetic oil adjust the temperature showing the maximum value of the loss tangent (tan δ) of the solid viscoelasticity of the foam body (A) according to the embodiment and the maximum value of the loss tangent, and thus, these additives may be used by controlling the kind and the amount added.

<Method of Producing Foam Body (A)>

The foam body (A) according to the embodiment can be obtained by, for example, foam-molding a resin composition (P) including a 4-methyl-1-pentene-based polymer (a1) or a 4-methyl-1-pentene-based polymer (a1) into a specific shape.

The molding apparatus and the molding conditions are not particularly limited, and known molding apparatuses and molding conditions in the related art can be adopted. It is preferable to perform molding by an extrusion molding apparatus.

As the molding method of the foam body (A) according to the embodiment, for example, known heat molding methods such as injection molding, extrusion molding (film·sheet extrusion, profile extrusion, fiber extrusion, strand extrusion, net extrusion, and the like), vacuum molding, blow molding, press molding, pressure forming, calender molding, bead molding, and batch foaming can be used. That is, examples of the foam body (A) according to the embodiment include an injection molded body, an extrusion molded body, a vacuum molded body, a blow molded body, a press molded body, a pressure molded body, a calender molded body, a bead molded body, and a batch foam body.

As the foam body (A) according to the embodiment, an extrusion molded body is preferable.

Method of Preparing Resin Composition (P) Including 4-Methyl-1-Pentene-Based Polymer (a1)

The resin composition (P) according to the embodiment can be prepared by mixing or melting and kneading each component by a dry blender, a tumbler mixer, a Banbury mixer, a single screw extruder, a twin screw extruder, a high speed twin screw extruder, a hot roll, and the like.

(Method of Molding Foam Body (A))

The foam body (A) according to the embodiment can be obtained by, for example, foam-molding the resin composition (P) into a specific shape using a molding apparatus.

As a foaming agent used in a case of molding the foam body (A) according to the embodiment, a chemical foaming agent and a physical foaming agent may be used.

Examples of the chemical foaming agent include sodium bicarbonate, ammonium bicarbonate, various carboxylates, sodium borohydride, azodicarbamide, N,N-dinitrosopentamethylenetetramine, P,P-oxybis(benzenesulfonyl hydrazide), azobisisobutyronitrile, para toluenesulfonyl hydrazide, and sodium bicarbonate sodium citrate.

Examples of the physical foaming agent include carbon dioxide, nitrogen, and a mixture of carbon dioxide and nitrogen, and any of these can be supplied in a gaseous, liquid or supercritical state.

The chemical foaming agent is preferably formulated and uniformly mixed with the resin composition before being introduced into an extrusion molding machine.

In addition, in a case of using carbon dioxide as the physical foaming agent, it is preferable that the resin composition is kneaded and plasticized in an extrusion molding machine and then injected directly into the extrusion molding machine.

The expansion ratio of the resin composition (P) is not particularly limited and can be suitably determined inconsideration of various physical properties of the obtained foam body (A).

<Application of Foam Body (A)>

The foam body (A) according to the embodiment can be used for, for example, mobility products such as automobile parts, railway parts, aircraft parts, ship parts, bicycle parts; electronic equipment; household electrical appliances; audio equipment; camera goods; precision equipment; game devices; VR devices; civil engineering and construction articles such as civil engineering parts, construction parts, and construction materials; household goods such as furniture and bedding; daily necessities such as kitchenware, toiletries and stationery; outdoor goods and leisure goods such as backpacks; agricultural goods for gardening or the like; decorative products such as apparel goods, shoe goods, accessories and small portable miscellaneous goods; medical related products such as medical goods and health care goods; sporting goods such as sports products; education and toy goods such as books and toys; packaging related goods such as packaging goods; cosmetics related goods such as face wash and makeup goods; lighting goods such as LED lighting; culture goods such as fishery goods; safety goods such as a child seat; music goods; pet goods; and fishing goods.

Specific examples of mobility products include handles, saddles, shift levers, bumpers, seats, seat belts, headrests, armrests, door trims, instrument panels, various supporters (neck supporters, lumbar supporters), various cushions, and damping materials.

Examples of electronic equipment include smartphone covers, personal computer covers, watch bands, mouses of personal computers, flexible fixed items, and flexible light.

Examples of household electrical appliances include washing machines, and single-lens reflex grips.

Examples of audio equipment include damping materials, vibration proofing materials, sound proofing materials, sound insulation materials, and speakers.

Examples of camera goods include cameras, and camera grips for broadcasting.

Examples of precision equipment include flexible touch panels, and flexible remote controllers.

Examples of game devices include controllers.

Examples of the VR devices include members used for the contact part with the VR devices, and remote controllers for VR.

Examples of civil engineering and building articles include damping materials, vibration proofing materials, sound proofing materials, sound insulation materials, sealing materials, and cushion materials.

Examples of household goods include chairs, legless chairs, legless chairs for backache, armchairs, shock absorbing materials of cushion and sofas, gap filling materials for filling gaps to which a heavy load or furniture load is applied, fall prevention measures goods for earthquakes and the like, sofas, damping materials, and vibration proofing materials.

Examples of bedding include chairs, mats, beds, futons, pillows, cushions, sitting cushions, hammocks, pillow covers, pillow cushion materials, mattresses, and hot-water bottles.

Examples of kitchenware include grips for cutting boards and kitchen knives, lunch boxes, water bottles, cups, plates, chopsticks, small bowls, wine coolers, wine bags, various insulation bags, drink jugs, coasters, pots, pans, cookware for microwave ovens, storage items in refrigerators and freezers (such as a partition plate, soft sealed container with a fitting part), steamers, table cloths, place mats, and jugs.

Examples of toiletries include paper diapers, toothbrushes, packings, gaskets, sealing materials, thermal insulation, hot water bottles, and bath goods used during bathing (particularly, goods that can utilize the temperature dependence of storage modulus, for example, properties that goods can become hard at a low temperature and can become soft at a high temperature). Examples of the bath goods used during bathing include surface materials for rubbing gloves, legless chairs, mats, roller members for face rollers, and acupressure goods to body surfaces having a solid shape.

Examples of stationery include pen grips, notebooks, notebook covers, and book covers.

Examples of other daily necessities include watch bands, thermometers, shock absorbing materials for fashion dolls, various grips (for pencils and toothbrushes), various covers (disposable hand warmers, notebooks, notebooks covers, western style toilet seats), shock absorbing materials for helmets, blackout curtains, and smartphones.

Examples of outdoor goods include athletic products, nets, tents, chairs, folding chairs, dishes, cutting boards, and hammocks.

Examples of agricultural and gardening goods include graft supporters, packings, gaskets, sealing materials, buckets, and watering cans.

Examples of apparel goods include clothes, underclothes, underwear (for example, bra pads, shoulder pads, and correcting underwear), hats, belts, school bag linings, business card cases, and glasses.

Examples of shoe goods include various insoles, lining materials for shoes, various equipment, shoes, and shoelaces.

The apparel goods and shoe goods do not easily turn yellow during washing or outdoor drying after washing and thus can be suitably used.

Examples of accessories and small portable miscellaneous goods include bracelets, anklets, necklaces, misangas, bangles, wallets, business card holders, various accessory cases, glasses, core materials of bags, nose pads of glasses, and earpieces of glasses.

Examples of medical goods include supporters, casts, bandages, various medical base tapes such as wound tapes, stress relieving goods, mental stabilizing goods, concentration improving goods, and attachment parts of artificial hands and artificial legs. Further, for the purpose of improving air permeability, it is possible to provide pores communicating with the front and back sides by known perforation processing techniques such as mechanical punching, needle processing, laser perforation, and the like.

Examples of healthcare goods and nursing care goods include pelvic correction bands, legless chairs for backache, health equipment, training gym equipment, spherical hand exercisers for training grasping power, magnetic necklaces, shock absorbing materials, various supporters (pressure supports for elbows, knees, hips, and the like), face line belts, snoring suppression face belts, waist wraps, pelvic belts, necklaces, bracelets, glasses, dementia prevention goods, magnet loops, stress relieving goods, and wheelchairs (chair parts and holding hands).

Examples of sports goods include sportswear, various grip tapes (for baseball bats, tennis rackets, badminton rackets, golf clubs, and the like), lining materials for ski and snowboard shoes, gloves, various protectors (foot pads for soccer and martial arts gear), clubs, skis, snowboards, various eye protectors, and various eye nets.

Examples of cultural and educational materials include picture books and maps.

Examples of books include picture books.

Examples of toys include shock absorbing materials for fashion dolls, stuffed toys and the like, masks, and flexible toys included in gacha toys.

Examples of packaging goods include heat-sealable various food packaging materials, medical packaging materials, various industrial packaging materials such as tapes, bundling bands, and strings, shock absorbing materials, and packaging materials.

Examples of cleansing and makeup goods include makeup puffs, face packs, and foundation tapes.

Examples of lighting goods include LED lighting such as flexible light.

Examples of fishery goods include culture sheets and blackout curtains.

Examples of music goods include rubber parts of earphones.

Examples of pet goods include sheets, collars, and toys.

Examples of fishing goods include grips for fishing rods, gloves for fishing, lures, nets and core materials around nets.

Further, various adhesive tapes provided with adhesive layers can be used.

Particularly, since the foam body (A) according to the embodiment is excellent in performance balance of flexibility, shape retainability, and shape followability, in a case where the foam body is applied to a member that may come into direct or indirect contact with a human body surface when used, the load applied to the human body can be reduced. Therefore, the foam body (A) according to the embodiment can be suitably applied to a member that may come into direct or indirect contact with a human body surface.

The foam body (A) according to the embodiment is considered to have a merit of obtaining an excellent body pressure dispersibility (uniformity in body pressure distribution) since the foam body is flexible and easily follows a three-dimensional shape when being applied to the human body surface.

Although the foam body (A) according to the embodiment is not particularly limited, the foam body may have a vent hole to increase air permeability depending on the application. For example, it is possible to provide a large number of vent holes communicating with the front and back sides by processing techniques such as mechanical punching, needle processing, laser perforation, water jet, and the like.

Thus, for example, in a case where the foam body is used for a member that may come into direct or indirect contact with a human body surface, it is possible to suppress stuffiness between a surface that comes into contact with the human body surface directly or indirectly and the human body surface.

<Complex (C)>

The foam body (A) according to the embodiment can be used for various applications by forming a complex (C) by combining the foam body (A) and a member (B) that is different from the foam body (A).

That is, the complex (C) according to the embodiment includes the foam body (A), and a member (B) that is bonded to the foam body (A) and is different from the foam body (A).

Since the foam body (A) according to the embodiment is excellent in performance balance of flexibility and shape followability, inherent properties such as shape followability and flexibility derived from the foam body (A) can be imparted to the member (B) different from the foam body (A). Therefore, the complex (C) according to the embodiment has combined properties of both the foam body (A) and the member (B). That is, the complex (C) according to the embodiment is excellent in performance balance of flexibility and shape followability.

For example, in a case where the foam body (A) is a foam sheet and the member (B) is a urethane foam having appropriate hardness and thickness as a cushioning member, it is possible to obtain a cushioning material (shock absorbing material) excellent in low rebound and body pressure dispersibility in applications such as shoulder pads, bra pads, pillows, mattresses and chairs as a complex (C) by bonding and laminating the foam body (A) and the member (B).

As the method of forming the complex (C) according to the embodiment, various known methods can be applied.

For example, the complex (C) can be prepared by laminating the member (B) on the foam body (A) and performing thermocompression bonding or welding by a press or the like as required.

In addition, the complex (C) can be prepared by applying an adhesive between the foam body (A) and the member (B) and then bonding the foam body (A) and the member (B) through the adhesive.

As the adhesive, an SBR-based solvent adhesive (for example, product name: BOND GP CLEAR, manufactured by Konishi Co., Ltd.), and a hot melt adhesive constituted of EVA, a petroleum resin, or a mixture of EVA and a petroleum resin can be suitably used.

The member (B) different from the foam body (A) is not particularly limited and examples thereof include woven fabrics, non-woven fabrics, synthetic fibers, artificial leathers, synthetic leathers, natural leathers, furs, metals, carbon materials, rubbers, thermoplastic elastomers, thermoplastic resins, thermosetting resins, polymer foam bodies, mesh structures (warped fibers, double russel meshes, three-dimensional spring structures, and the like), fiber reinforced plastics, papers, woods, glass, stones, and ceramics. These members may be used alone or in combination of two or more thereof. The complex (C) according to the embodiment may be, for example, a laminated product obtained by bonding a suede-like artificial leather (product name: ULTRA SUEDE) from Toray Industries, Inc. as an artificial leather and the foam body (A); a laminated product obtained by bonding various base cloths (PVC, polyester, polyurethane, split fabric, and the like) and the foam body (A); or a laminated product obtained by bonding, sewing or physically overlapping an urethane foam body (including a low rebound resilience urethane foam body) as a polymer foam body and the foam body (A).

Although the embodiments of the first invention of the present application have been described above, these are examples of the first invention and various configurations other than the above configurations can be adopted.

2. Second Invention

<Polyolefin-Based Foam Sheet>

A polyolefin-based foam sheet according to a second invention is a polyolefin-based foam sheet constituted of a 4-methyl-1-pentene-based polymer and when the Shore A hardness of at least one surface of the polyolefin-based foam sheet immediately after measurement, which is measured at 23° C. according to JIS K 6253, is $HS_0$ and the Shore A hardness 15 seconds after the measurement is $HS_1$, $\Delta HS$ expressed by ($HS_0$–$HS_1$) is 30 or more and 60 or less.

Here, the Shore A hardness ($HS_0$ and $HS_1$) can be measured by a Shore hardness meter. In addition, the Shore A hardness ($HS_0$) is a Shore A hardness value immediately after the starting of needle contact and the Shore A hardness ($HS_1$) is a Shore A hardness value 15 seconds after the starting of needle contact.

As described above, generally, although the polyolefin-based foam sheet is excellent in flexibility, the polyolefin-based foam sheet cannot retain its shape in a case of changing the shape and is inferior in shape retainability and shape followability. Therefore, a polyolefin-based foam sheet having excellent flexibility, shape retainability, and shape followability is not known.

The present inventors have conducted intensive investigations to realize a polyolefin-based foam sheet excellent in flexibility, shape retainability, and shape followability. As a result, it has been found for the first time that in a polyolefin-based foam sheet using a 4-methyl-1-pentene-based polymer, by setting a difference ($\Delta HS = HS_0 - HS_1$) between the Shore A hardness ($HS_0$) immediately after measurement and the Shore A hardness ($HS_1$) 15 seconds after the measurement to a predetermined range, the performance balance of flexibility, shape retainability, and shape followability can be improved, and thus completed the second invention of the present application.

That is, according to the polyolefin-based foam sheet according to the embodiment, by setting a difference ($\Delta HS = HS_0 - HS_1$) between the Shore A hardness ($HS_0$) immediately after measurement and the Shore A hardness ($HS_1$) 15 seconds after the measurement to 30 or more and 60 or less, the performance balance of flexibility, shape retainability, and shape followability of the polyolefin-based foam sheet can be improved.

From the above, according to the embodiment, it is possible to realize a polyolefin-based foam sheet excellent in performance balance of flexibility, shape retainability, and shape followability.

The $\Delta HS$ of the polyolefin-based foam sheet according to the embodiment is 30 or more, but from the viewpoint of further improving shape retainability and shape followability, the $\Delta HS$ is preferably 33 or more, more preferably 37 or more, and still more preferably 40 or more.

In addition, the $\Delta HS$ of the polyolefin-based foam sheet according to the embodiment is 60 or less. From the viewpoint of further improving flexibility, the $\Delta HS$ is preferably 58 or less, more preferably 55 or less, and still more preferably 53 or less.

From the viewpoint of further improving flexibility, the $HS_0$ of the polyolefin-based foam sheet according to the embodiment is preferably 85 or less, more preferably 82 or less, and still more preferably 80 or less.

In addition, from the viewpoint of further improving mechanical properties, the $HS_0$ of the polyolefin-based foam sheet according to the embodiment is preferably 40 or more, more preferably 45 or more, and still more preferably 50 or more.

In the embodiment, for example, by appropriately adjusting (1) the kind and the mixing ratio of the 4-methyl-1-pentene-based polymer constituting the polyolefin-based foam sheet, (2) whether or not the polyolefin-based foam sheet is crosslinked, and (3) a foam molding method or the like, the $\Delta HS$ and $HS_0$ can be controlled to be in the above.

In the range, for example, increasing the mixing ratio of the 4-methyl-1-pentene-based polymer, not conducting crosslinking treatment on the polyolefin-based foam sheet, performing foam molding by extrusion molding, and the like are factors for setting the $\Delta HS$ and $HS_0$ to the desired numerical range.

The polyolefin-based foam sheet according to the embodiment is preferably not crosslinked from the viewpoint of improving the shape retainability and the shape followability. That is, the polyolefin-based foam sheet according to the embodiment is preferably an uncrosslinked sheet which is not subjected to a crosslinking treatment, for example, ionizing radiation crosslinking using an electron beam or γ-ray. Thus, the $\Delta HS$ can be improved and a polyolefin-based foam sheet more excellent in shape retainability and shape followability can be obtained.

The density of the polyolefin-based foam sheet according to the embodiment is preferably 0.80 g/cm³ or less, more preferably 0.75 g/cm³ or less, still more preferably 0.70 g/cm³ or less, and particularly preferably 0.65 g/cm³ or less. In a case where the density is equal to or lower than the upper limit, a lighter polyolefin-based foam sheet can be obtained, the blocking resistance of the polyolefin-based foam sheet can be further improved or the smoothness of the surface can be improved, and as a result, the touch feeling can be improved.

In addition, the density of the polyolefin-based foam sheet is 0.10 g/cm³ or more, more preferably 0.20 g/cm³ or more, still more preferably 0.30 g/cm³ or more, and particularly preferably 0.40 g/cm³ or more. In a case where the density is equal to or more than the lower limit, the mechanical properties, such as bending properties and tensile properties, of the polyolefin-based foam sheet can be further improved.

The density of the polyolefin-based foam sheet according to the embodiment can be controlled to be in the above range by appropriately controlling, for example, the kind and the mixing amount of the 4-methyl-1-pentene-based polymer and a foamable modified resin described later, the expansion ratio of the polyolefin-based foam sheet, and the like respectively.

The maximum peak height (Rp) of at least one surface of the polyolefin-based foam sheet according to the embodiment is 190 μm or less and more preferably 180 μm or less from the viewpoint of improving touch feeling of the sheet surface.

The lower limit of the maximum peak height (Rp) is not particularly limited and is for example 30 μm or more.

The maximum peak height (Rp) of the surface of the polyolefin-based foam sheet can be measured according to the JIS B0601:2001.

The maximum peak height (Rp) of the surface of the polyolefin-based foam sheet according to the embodiment can be controlled to be in the above range by appropriately controlling, for example, the kind and the mixing amount of the 4-methyl-1-pentene-based polymer and the foamable modified resin, the expansion ratio of the polyolefin-based foam sheet, the foam cell size, the distribution and the number density of foam cells in unit volume (sometimes simply referred to as cell density), and the like respectively.

The melt tension of the polyolefin-based foam sheet according to the embodiment at 180° C. is preferably 10 mN or more and 1000 mN or less, and more preferably 20 mN or more and 500 mN or less from the viewpoint of further improving appearance, feel, foamability (for example, expansion ratio and cell density), and the like.

The melt tension of the polyolefin-based foam sheet according to the embodiment at 180° C. can be controlled to be in the above range by appropriately controlling the kind and the mixing amount of the 4-methyl-1-pentene-based polymer and the foamable modified resin respectively.

It is preferable that the temperature showing the maximum value of loss tangent (tan δ) of dynamic viscoelasticity of the polyolefin-based foam sheet according to the embodiment is at least one temperature in at least a range of 10° C. or higher and 40° C. or lower, and the maximum value of the loss tangent is 0.8 or more and 3 or less. Thus, at around room temperature, the performance balance of flexibility, shape retainability, and shape followability of the polyolefin-based foam sheet according to the embodiment can be further improved.

The thickness of the polyolefin-based foam sheet according to the embodiment is not particularly limited and for example, the thickness is 0.1 mm or more and 30 mm or less, preferably 0.2 mm or more and 20 mm or less, and more preferably 0.3 mm or more and 12 mm or less. In a case where the thickness of the polyolefin-based foam sheet according to the embodiment is in the above range, the balance of flexibility, shape retainability, shape followability, lightness, mechanical properties, handleability, appearance, formability, moisture resistance, and the like is more excellent.

Hereinafter, each component constituting the polyolefin-based foam sheet according to the embodiment will be described.

4-Methyl-1-Pentene-Based Polymer

The polyolefin-based foam sheet according to the embodiment includes a 4-methyl-1-pentene-based polymer as an essential component.

As the 4-methyl-1-pentene-based polymer according to the embodiment, for example, a 4-methyl-1-pentene·α-olefin copolymer (A) including a constitutional unit (A1) derived from 4-methyl-1-pentene and a constitutional unit (A2) derived from an α-olefin having 2 to 20 carbon atoms excluding 4-methyl-1-pentene may be used.

Here, in the embodiment, "an α-olefin having 2 to 20 carbon atoms" does not include 4-methyl-1-pentene unless otherwise specified.

In the 4-methyl-1-pentene·α-olefin copolymer (A) according to the embodiment, from the viewpoint of further improving the flexibility of the polyolefin-based foam sheet, when the total of the constitutional unit (A1) and the constitutional unit (A2) is 100 mol %, it is preferable that the content of the constitutional unit (A1) is 10 mol % or more and 90 mol % or less and the content of the constitutional unit (A2) is 10 mol % or more and 90 mol % or less.

In addition, in the 4-methyl-1-pentene·α-olefin copolymer (A) according to the embodiment, from the viewpoint of further improving the flexibility and the mechanical properties of the polyolefin-based foam sheet, when the total of the constitutional unit (A1) and the constitutional unit (A2) is 100 mol %, it is more preferable that the content of the constitutional unit (A1) is 20 mol % or more and 85 mol % or less and the content of the constitutional unit (A2) is 15 mol % or more and 80 mol % or less, it is still more preferable that the content of the constitutional unit (A1) is 30 mol % or more and 80 mol % or less and the content of the constitutional unit (A2) is 20 mol % or more and 70 mol % or less, it is even still more preferable that the content of the constitutional unit (A1) is 40 mol % or more and 75 mol % or less and the content of the constitutional unit (A2) is 25 mol % or more and 60 mol % or less, it is even still more preferable that the content of the constitutional unit (A1) is 50 mol % or more and 75 mol % or less and the content of the constitutional unit (A2) is 25 mol % or more and 50 mol % or less, and it is particularly preferable that the content of the constitutional unit (A1) is 60 mol % or more and 75 mol % or less and the content of the constitutional unit (A2) is 25 mol % or more and 40 mol % or less.

In the embodiment, examples of the α-olefin having 2 to 20 carbon atoms used in the 4-methyl-1-pentene·α-olefin copolymer (A) include a linear or branched α-olefin, a cyclic olefin, an aromatic vinyl compound, a conjugated diene, and a functionalized vinyl compound, and a linear α-olefin is preferable.

The number of carbon atoms in the linear α-olefin is preferably 2 to 10 and more preferably 2 or 3. Examples of the linear α-olefin include ethylene, propylene, 1-butene, 1-pentene, 1-hexene, 1-octene, 1-decene, 1-undesen, 1-dodecene, 1-tetradecene, 1-hexadecene, 1-octadecene, and 1-eicosene. One or two or more selected from ethylene, propylene, 1-butene, 1-pentene, 1-hexene, 1-octene, and 1-decene are preferable and at least one selected from ethylene and propylene is more preferable.

The number of carbon atoms in the branched α-olefin is preferably 5 to 20 and more preferably 5 to 15. Examples of the branched α-olefin include 3-methyl-1-butene, 3-methyl- 1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene.

The number of carbon atoms in the cyclic olefin is preferably 5 to 15. Examples of the cyclic olefin include cyclopentene, cyclohexene, cycloheptene, norbornene, 5-methyl-2-norbornene, tetracyclododecene, and vinylcyclohexane.

Examples of the aromatic vinyl compound include styrene, and mono- or polyalkylstyrene such as α-methylstyrene, o-methylstyrene, m-methylstyrene, p-methylstyrene, o,p-dimethylstyrene, o-ethylstyrene, m-ethylstyrene, and p-ethylstyrene.

The number of carbon atoms in the conjugated diene is preferably 4 to 20 and more preferably 4 to 10. Examples of the conjugated diene include 1,3-butadiene, isoprene, chloroprene, 1,3-pentadiene, 2,3-dimethylbutadiene, 4-methyl-1,3-pentadiene, 1,3-hexadiene, and 1,3-octadiene.

Examples of the functionalized vinyl compound include hydroxyl group-containing olefins; halogenated olefins; unsaturated carboxylic acids such as (meth)acrylic acid, propionic acid, 3-butenoic acid, 4-pentenoic acid, 5-hexenoic acid, 6-heptenoic acid, 7-octenoic acid, 8-nonenoic acid, 9-decenoic acid, and 10-undecenoic acid, and anhydrides thereof, unsaturated amines such as acid halide, allylamine, 5-hexenamine, 6-heptenamine, unsaturated acid anhydrides such as (2,7-octadienyl) succinic anhydride, pentapropenylsuccinic anhydride, unsaturated epoxy compounds, and ethylenically unsaturated silane compounds.

Examples of the hydroxyl group-containing olefin include linear or branched terminal-hydroxylated α-olefins having 2 to 20, preferably 2 to 15, carbon atoms.

Examples of the halogenated olefin include linear or branched halogenated α-olefins having 2 to 20, preferably 2 to 15, carbon atoms.

These α-olefins having 2 to 20 carbon atoms may be used alone or in combination of two or more thereof. Among these, ethylene and propylene are suitable, and propylene is particularly preferably used from the viewpoint of being capable of further improving flexibility or the like.

The 4-methyl-1-pentene·α-olefin copolymer (A) may include other constitutional units in addition to the constitutional units (A1) and (A2) within the range not impairing the object of the present invention. Other constitutions include constitutional units derived from non-conjugated polyenes.

Examples of the non-conjugated polyene include linear, branched, or cyclic dienes having preferably 5 to 20, more preferably 5 to 10, carbon atoms, various norbornes, and norbornadienes. Among these, 5-vinylidene-2-norbornene and 5-ethylidene-2-norbornene are preferable.

The intrinsic viscosity [η] of the 4-methyl-1-pentene-based polymer according to the embodiment at 135° C. in decalin is preferably 0.01 to 5.0 dL/g, more preferably 0.1 to 4.0 dL/g, still more preferably 0.5 to 3.0 dL/g, and particularly preferably 1.0 to 2.8 dL/g from the viewpoint of further improving the flexibility and the mechanical strength of the polyolefin-based foam sheet.

The density of the 4-methyl-1-pentene-based polymer according to the embodiment measured according to ASTM D 1505 (water substitution) is preferably 0.810 to 0.850 $g/cm^3$, more preferably 0.820 to 0.850 $g/cm^3$, and still more preferably 0.830 to 0.850 $g/cm^3$.

The 4-methyl-1-pentene-based polymer according to the embodiment can be produced by various methods. For example, the 4-methyl-1-pentene-based polymer can be produced using known catalysts such as magnesium-supported titanium catalysts; metallocene catalysts described in International Publication No. WO 01/53369, International Publication No. WO 01/027124, Japanese Laid-open Patent Publication No. H03-193796, and Japanese Laid-open Patent Publication No. H02-41303; and metallocene compound-containing olefin polymerization catalysts described in International Publication No. WO 2011/055803.

The content of the 4-methyl-1-pentene-based polymer in the polyolefin-based foam sheet according to the embodiment is not particularly limited. When the entire polyolefin-based foam sheet is 100% by mass, the content of the 4-methyl-1-pentene-based polymer is preferably 50% by mass or more, more preferably 60% by mass or more, still more preferably 65% by mass or more, and particularly preferably 70% by mass or more. The content of the 4-methyl-1-pentene-based polymer is preferably 100% by mass or less, more preferably 99.5% by mass or less, still more preferably 99% by mass or less, even still more preferably 98% by mass or less, and particularly preferably 97% by mass or less.

Thus, it is possible to obtain a polyolefin-based foam sheet which is more excellent in balance of flexibility, shape retainability, shape followability, lightness, mechanical properties, handleability, appearance, moldability, moisture resistance, and the like.

<Foamable Modified Resin>

The polyolefin-based foam sheet according to the embodiment preferably contains a foamable modified resin (however, excluding the 4-methyl-1-pentene-based polymer according to the embodiment) from the viewpoint of further improving appearance, a touch feeling, foamability (for example, expansion ratio, cell density), and the like.

The foamable modified resin according to the embodiment is not particularly limited as long as the resin improves the foamability of the polyolefin-based foam sheet. For example, a thermoplastic resin is preferable.

Examples of thermoplastic resins (however, excluding the 4-methyl-1-pentene-based polymer according to the embodiment) include thermoplastic polyolefin resins such as low density polyethylene, mediumdensitypolyethylene, high density polyethylene, high pressure low density polyethylene, polypropylene, poly 1-butene, poly 4-methyl-1-pentene, poly 3-methyl-1-butene, ethylene·α-olefin copolymers, propylene·α-olefin copolymers, 1-butene·α-olefin copolymers, cyclic olefin copolymers, and chlorinated polyolefin; thermoplastic polyamide-based resins such as aliphatic polyamides (such as nylon 6, nylon 11, nylon 12, nylon 66, nylon 610, and nylon 612), and polyether block amide; thermoplastic polyester-based resins such as polyethylene terephthalate, polybutylene terephthalate, and polyester-based elastomers; thermoplastic vinyl aromatic resins such as polystyrene, ABS resin, AS resin, and styrene-based elastomers (styrene·butadiene·styrene block polymer, styrene·isoprene·styrene block polymer, styrene·isobutylene·styrene block polymer, and the above-mentioned hydrogen additives); thermoplastic polyurethanes; vinyl chloride resin; vinylidene chloride resin; acryl resin; ethylene·vinyl acetate copolymers; ethylene·methacrylic acid acrylate copolymers; ionomers; ethylene·vinyl alcohol copolymers; polyvinyl alcohols; fluorine-based resins such as polyvinyl fluoride resin, polytetrafluoroethylene, polyvinylidene fluoride, and ETFE; polycarbonates; polyacetals; polyphenylene oxides; polyphenylene sulfides; polyimides; polyarylates; polysulfones; polyether sulfones; rosin-based resins; terpene-based resins; petroleum resins; and copolymer rubbers, such as ethylene·α-olefin·diene copolymers, propylene·α- olefin·diene copolymers, 1-butene·α-olefin·diene copolymers, polybutadiene rubber, polyisoprene rubber, neoprene rubber, nitrile rubber, butyl rubber, polyisobutylene rubber, natural rubbers, and silicone rubber. In addition, these resins may be acid-modified with acrylic acid, methacrylic acid, maleic acid, and the like.

Among these foamable modified resins, one or two or more selected from low density polyethylene, medium density polyethylene, high density polyethylene, high pressure low density polyethylene, polypropylene, poly 1-butene, poly 4-methyl-1-pentene, poly 3-methyl-1-butene, ethylene·α-olefin copolymers, propylene·α-olefin copolymers, 1-butene·α-olefin copolymers, polyether block amides, styrene-based elastomers, acid-modified styrene-based elastomers, vinyl acetate copolymers, ethylene·methacrylic acid acrylate copolymers, ionomers, fluorine-based resins, acid-modified fluorine-based resins, rosin-based resins, terpene-based resins, and petroleum resins are preferable, and one or two or more, which are selected from polyethylene, polypropylene, poly 1-butene, poly 4-methyl-1-pentene, ethylene·α-olefin copolymers, propylene·α-olefin copolymers, 1-butene·α-olefin copolymers, vinyl acetate copolymers, styrene-based elastomers, acid-modified styrene-based elastomers, polyether block amides, thermoplastic polyurethane, ionomers, fluorine-based resins, acid-modified fluorine-based resins, rosin-based resin, terpene-based resins, and petroleum resins, and improves melt tension by being added, are more preferable. In addition, it is still more preferable that the resin is appropriately compatible with the 4-methyl-1-pentene-based polymer.

In the polyolefin-based foam sheet according to the embodiment, these foamable modified resins may be used alone or in combination of two or more thereof.

The content of the foamable modified resin in the polyolefin-based foam sheet according to the embodiment is not particularly limited but when the entire polyolefin-based foam sheet is 100% by mass, the content of the foamable modified resin is preferably 0.5% by mass or more, more preferably 1% by mass or more, still more preferably 2% by mass or more, and even still more preferably 3% by mass or more. The content of the foamable modified resin is preferably 50% by mass or less, more preferably 40% by mass or less, still more preferably 35% by mass or less, even still more preferably 30% by mass or less, and particularly preferably 25% by mass or less.

In a case where the content of the foamable modified resin is equal to or more than the lower limit, the appearance, touch feeling, and foamability (for example, expansion ratio, cell density) of the polyolefin-based foam sheet according to the embodiment can be further improved. In a case where the content of the foamable modified resin is equal to or less than the upper limit, the performance balance of flexibility, shape retainability, and shape followability of the polyolefin-based foam sheet according to the embodiment can be further improved.

<Other Components>

The polyolefin-based foam sheet according to the embodiment may be mixed with additives such as a heat-resistant stabilizer, an antioxidant, an ultraviolet absorber, a pigment, an antistatic agent, a copper inhibitor, a flame retardant, a neutralizing agent, a foaming agent, a plasticizer, a nucleating agent, an antifoaming agent, a weathering stabilizer, a light resistance stabilizer, an antiaging agent, a fatty acid metal salt, a softener, a dispersing agent, a coloring agent, a lubricant, natural oil, synthetic oil, and wax as required.

<Method of Producing Polyolefin-Based Foam Sheet>

The polyolefin-based foam sheet can be obtained by, for example, foam-molding a resin composition including a 4-methyl-1-pentene-based polymer or only a 4-methyl-1-pentene-based polymer into a sheet shape.

The molding apparatus and the molding conditions are not particularly limited, and known molding apparatuses and molding conditions in the related art can be adopted. In a case of using extrusion molding, a skin layer is not easily formed on the surface of the obtained polyolefin-based foam sheet and a polyolefin-based foam sheet the ΔHS is in the desired range is easily obtained.

(Method of Preparing 4-Methyl-1-Pentene-Based Polymer-Based Resin Composition)

The 4-methyl-1-pentene-based polymer-based resin composition according to embodiment can be prepared by mixing or melting and kneading each component by a dry blend, a tumbler mixer, a Banbury mixer, a single screw extruder, a twin screw extruder, a high speed twin screw extruder, a hot roll or the like.

(Method of Molding Polyolefin-Based Foam Sheet)

The polyolefin-based foam sheet according to the embodiment can be obtained by, foam-molding the above-described 4-methyl-1-pentene-based polymer-based resin composition into a sheet shape, for example, using an extrusion molding machine.

As a foaming agent used in a case of molding the polyolefin-based foam sheet according to the embodiment, a chemical foaming agent and a physical foaming agent may be used.

Examples of the chemical foaming agent include sodium bicarbonate, ammonium bicarbonate, various carboxylates, sodium borohydride, azodicarbamide, N,N-dinitrosopentamethylenetetramine, P,P-oxybis(benzenesulfonyl hydrazide), azobisisobutyronitrile, para toluenesulfonyl hydrazide, and sodium bicarbonate sodium citrate.

Examples of the physical foaming agent include carbon dioxide, nitrogen, and a mixture of carbon dioxide and nitrogen, and any of these can be supplied in a gaseous, liquid or supercritical state.

The chemical foaming agent is preferably formulated and uniformly mixed with the 4-methyl-1-pentene-based polymer-based resin composition before being introduced into an extrusion molding machine.

In addition, in a case of using carbon dioxide as the physical foaming agent, it is preferable that the 4-methyl-1-pentene-based polymer-based resin composition is kneaded and plasticized in an extrusion molding machine and then injected directly into the extrusion molding machine.

The expansion ratio of the 4-methyl-1-pentene-based polymer-based resin composition is not particularly limited and can be suitably determined in consideration of various physical properties of the obtained polyolefin-based foam sheet.

<Application of Polyolefin-Based Foam Sheet>

The polyolefin-based foam sheet according to the embodiment is suitably used for, for example, damping materials, vibration proofing materials, sound proofing materials or sound insulation materials in the field of automobiles, railways, aircrafts, ships, civil engineering, construction, household electrical appliances such as washing machines, and audio equipment. In addition, the polyolefin-based foam sheet can also be used for various grips (such as handles for automobiles and bicycles, sports goods such as baseball bats, tennis rackets, and golf clubs, and daily necessities such as pencils, toothbrushes, and cookware), shock absorbing materials of various gloves, underwear goods such as bra cups, lining materials for ski shoes, packing, gaskets, sealing materials, protectors, shoe insoles, sportswear and clothing (including belts and hats), linings for bags, various bedding such as pillows (including water pillows) and mattresses, nursing care goods, shock absorbing materials for furniture such as cushion and seats, gap filling materials for filling gaps to which a heavy load or furniture load is applied, bicycle saddles, shock absorbing materials for various health goods, supporters that hold each part of the body, bath goods used during bathing (for example, legless chair shock absorbing materials), covers for hot water bottles and disposable hand warmers, smartphone covers, toys and miscellaneous goods including a shock absorbing material such as stuffed toys and fashion dolls, grafting supporters in the field of agriculture and gardening, simple casts, bandages, heat-sealable food or industrial packaging and packing materials, and the like. Further, the polyolefin-based foam sheets can be used as various adhesive tapes by applying an adhesive layer.

Particularly, since the polyolefin-based foam sheet according to the embodiment is excellent in performance balance of flexibility, shape retainability, and shape followability, in a case where the polyolefin-based foam sheet is applied to a member that may come into direct or indirect contact with a human body surface, the load applied to the human body can be reduced. Therefore, the polyolefin-based foam sheet according to the embodiment can be suitably applied to a member that may come into direct or indirect contact with a human body surface. For example, in a case where the polyolefin-based foam sheet is used as a constitutional member for a mattress for bedding or an insole, it is considered to have a merit of being excellent in body pressure dispersibility (uniformity in body pressure distribution) since the polyolefin-based foam sheet is flexible and easily follows a three-dimensional shape when a part of the weight is applied to each member.

In addition, for high heels and pumps for women, by the support pad function for a specific area such as the arch, which is a part of the sole, the shoe rubbing part of the heel, or the toe part, and the effect of flowing the solid shape of the sole, the effect of preventing slip of feet inside the footwear during walking or exercise can be expected. Further, as the polyolefin-based foam sheet according to the embodiment, various urethane-based foam materials, which are widely used as shock absorbing materials including an insole in the related art and are excellent in flexibility and cushioning properties, crosslinked foam materials formed of polyethylene or an ethylene vinyl acetate copolymer, styrene-based elastomers and silicone elastomers, well-ventilated pile fabrics a skin material for suppressing the internal heat of footwear, and the like may be combined by bonding and lamination and used.

In addition, for example, the application of the polyolefin-based foam sheet according to the embodiment is the same as the application of the foam body (A) according to the first invention of the present application. Regarding the same applications as the applications of the foam body (A) according to the first invention of the present application, the detailed description thereof is omitted.

<Complex>

The polyolefin-based foam sheet according to the embodiment can be used for various applications by forming a complex by combining the polyolefin-based foam sheet with a member different from the polyolefin-based foam sheet.

That is, the complex according to the embodiment includes the polyolefin-based foam sheet according to the embodiment and a member which is bonded to the polyolefin-based foam sheet according to the embodiment and is different from the polyolefin-based foam sheet according to the embodiment.

Since the polyolefin-based foam sheet according to the embodiment is excellent in performance balance of flexibility and shape followability, inherent properties, such as shape followability and flexibility, derived from the polyolefin-based foam sheet according to the embodiment can be imparted to a member different from the polyolefin-based foam sheet according to the embodiment. Therefore, the complex according to the embodiment has combined properties of both the polyolefin-based foam sheet according to the embodiment and the member different from the polyolefin-based foam sheet according to the embodiment. That is, the complex according to the embodiment is excellent in performance balance of flexibility and shape followability.

For example, in a case where the member different from the polyolefin-based foam sheet according to the embodiment is a urethane foam having appropriate hardness and thickness as a cushioning member, it is possible to obtain a cushioning material (shock absorbing material) excellent in low rebound and body pressure dispersibility in applications such as shoulder pads, bra pads, pillows, mattresses and chairs by bonding and laminating the polyolefin-based foam sheet according to the embodiment and the member different from the polyolefin-based foam sheet according to the embodiment to form a complex.

As the method of forming the complex according to the embodiment, various known methods can be applied.

For example, the complex can be prepared by laminating another member on the polyolefin-based foam sheet according to the embodiment and performing thermocompression bonding or welding by a press or the like as required.

In addition, the complex can be prepared by applying an adhesive between the polyolefin-based foam sheet according to the embodiment and another member and then bonding the polyolefin-based foam sheet according to the embodiment and the other member through the adhesive.

As the adhesive, an SBR-based solvent adhesive (for example, product name: BOND GP CLEAR, manufactured by Konishi Co., Ltd.), and a hot melt adhesive constituted of EVA, a petroleum resin, or a mixture of EVA and a petroleum resin can be suitably used.

The member different from the polyolefin-based foam sheet according to the embodiment is not particularly limited and examples thereof include woven fabrics, non-woven fabrics, synthetic fibers, artificial leathers, synthetic leathers, natural leathers, furs, metals, carbon materials, rubbers, thermoplastic elastomers, thermoplastic resins, thermosetting resins, polymer foam bodies, mesh structures (warped fibers, double russel meshes, three-dimensional spring structures, and the like), fiber reinforced plastics, papers, woods, glass, stones, and ceramics. These members may be used alone or in combination of two or more thereof. The complex according to the embodiment may be, for example, a laminated product obtained by bonding a suede-like artificial leather (product name: ULTRA SUEDE) from Toray Industries, Inc. as an artificial leather and the polyolefin-based foam sheet according to the embodiment; a laminated product obtained by bonding various base cloths (PVC, polyester, polyurethane, split fabric, and the like) and the polyolefin-based foam sheet according to the embodiment; or a laminated product obtained by bonding, sewing or physically overlapping an urethane foam body (including a low rebound resilience urethane foam body) as a polymer foam body and the polyolefin-based foam sheet according to the embodiment.

Although the embodiments of the second invention of the present application have been described above, these are examples of the second invention and various configurations other than the above configurations can be adopted.

3. Third Invention

<Complex (C2)>

A complex (C2) according to a third invention includes a foam body (A2) constituted of a 4-methyl-1-pentene-based polymer, and a member (B2) which is bonded to the foam body (A2) and is different from the foam body (A2).

Since the foam body (A2) constituted of a 4-methyl-1-pentene-based polymer is excellent in performance balance of flexibility and the shape followability, the inherent properties, such as shape followability and flexibility, derived from the foam body (A2) can be imparted to the member (B2) different from the foam body (A2). Therefore, the complex (C2) according to the embodiment have combined properties of both the foam body (A2) and the member (B2). That is, the complex (C2) according to the embodiment is excellent in performance balance of the flexibility and the shape followability.

For example, in a case where the foam body (A2) is a foam sheet and the member (B2) is a urethane foam having appropriate hardness and thickness as a cushioning member, it is possible to obtain a cushioning material (shock absorbing material) excellent in low rebound and body pressure dispersibility in applications such as shoulder pads, bra pads, pillows, mattresses, and chairs by forming a complex (C2) by bonding and laminating the foam body (A2) and the member (B2).

As the method of forming the complex (C2) according to the embodiment, various known methods can be applied.

For example, the complex (C2) can be prepared by laminating the member (B2) on the foam body (A2) and performing thermocompression bonding or welding by a press or the like as required.

In addition, the complex (C2) can be prepared by applying an adhesive between the foam body (A2) and the member (B2) and then bonding the foam body (A2) and the member (B2) through the adhesive.

As the adhesive, an SBR-based solvent adhesive (for example, product name: BOND GP CLEAR, manufactured by Konishi Co., Ltd.), and a hot melt adhesive constituted of EVA, a petroleum resin, or a mixture of EVA and a petroleum resin can be suitably used.

The member (B2) different from the foam body (A2) is not particularly limited and examples thereof include woven fabrics, non-woven fabrics, synthetic fibers, artificial leathers, synthetic leathers, natural leathers, furs, metals, carbon materials, rubbers, thermoplastic elastomers, thermoplastic resins, thermosetting resins, polymer foam bodies, mesh structures (warped fibers, double russel meshes, three-dimensional spring structures, and the like), fiber reinforced plastics, papers, woods, glass, stones, and ceramics. These members may be used alone or in combination of two or more thereof. The complex (C2) according to the embodiment may be, for example, a laminated product obtained by bonding a suede-like artificial leather (product name: ULTRA SUEDE) from Toray Industries, Inc. as an artificial leather and the foam body (A2); a laminated product obtained by bonding various base cloths (sheets formed of PVC and olefin thermoplastic elastomer with embossed patterns, polyester, polyurethane, split fabric, and the like) and the foam body (A2); or a laminated product bonded by welding, sewing, or bonding or physically overlapping a latex foam body or an urethane foam body (including a low rebound resilience urethane foam body) as a polymer foam body and the foam body (A2).

As the 4-methyl-1-pentene-based polymer used in the foam body (A2) according to the embodiment, the same 4-methyl-1-pentene-based polymer as the 4-methyl-1-pentene-based polymer (a1) in the first invention of the present application can be used. In addition, as the method of molding the foam body (A2) according to the embodiment, the same molding method as the method of molding the foam body (A1) in the first invention of the present application can be used. Therefore, the detailed description thereof is omitted.

For example, the application of the complex (C2) according to the embodiment is the same as the application of the foam body (A) in the first invention of the present application. Therefore, the detailed description thereof is omitted.

Although the embodiments of the third invention of the present application have been described above, these are examples of the third invention and various configurations other than the above configurations can be adopted.

Although the embodiments of each invention of the present application have been described above, these are examples of the present invention and various configurations other than the above configurations can be adopted.

In addition, the present invention is not limited to the above-mentioned embodiments and modifications, improvements, and the like within the range in which the objects of the present invention can be achieved are included the present invention.

Needless to say, each invention of the present application described above can be combined within the range in which the contents thereof do not contradict each other.

EXAMPLES

Example and Comparative Example According to First Invention of Present Application Hereinafter, the first invention of the present application will be specifically described based on examples, but the first invention of the present application is not limited to these examples.

1. Measurement Method (1) Density of Foam Body (A)

A test piece was cut out from the foam body (A) and the test piece mass (g) was divided the by volume ($cm^3$) obtained from the outer dimension of the test piece to obtain density.

(2) Dynamic Viscoelasticity Measurement

The foam body (A) was cut into a strip having a size of 30 mm length×10 mm width, and the strip was used as a test piece. Next, the temperature dependence of dynamic viscoelasticity was measured using MC301 manufactured by Anton Paar GmbH under the conditions of a chuck distance of 20 mm, a frequency of 1.59 Hz, a distortion of 0.1%, a temperature increase rate of 4° C./min in a twist mode in a measurement temperature range of 0° C. to 110° C. From the obtained graph, the temperature showing the maximum value of the loss tangent (tan δ) and the maximum value of the tan δ were respectively obtained.

(3) Evaluation of Flexibility of Foam Body (A)

The foam body (A) was cut into a strip having a size of 100 mm length×20 mm width, and the strip was used as a test piece. The test piece was bent at the center of the test piece so as to hold a state in which the test piece was in contact with the upper and lower surfaces of a brass flat plate 1 (100 mm×100 mm×1 mm thickness) on a horizontal surface under an environment of 23° C. Next, a brass flat plate 2 (50 mm×50 mm×1 mm thickness) was overlapped with the brass flat plate immediately, and a weight was placed on the test piece so that the total load was 1 kgf. This state was held for 3 minutes and then the load was removed.

Next, the flexibility of the foam body (A) was evaluated based on the following standards.
- ◯: No whitening, crevices or cracks was visually observed in the bent part.
- X: Whitening, crevices or cracks was easily visually observed in the bent part.

(4) Evaluation of Shape Retainability of Foam Body (A)

The foam body (A) was cut into a strip having a size of 100 mm length×20 mm width and the strip was used as a test piece. The test piece was bent at the center of the test piece so as to hold a state in which the test piece was in contact with the upper and lower surfaces of a brass flat plate 1 (100 mm×100 mm×1 mm thickness) on a horizontal surface under an environment of 23° C. Next, a brass flat plate 2 (50 mm×50 mm×1 mm thickness) was overlapped with the brass flat plate immediately, and a weight was placed on the test piece so that the total load was 9.8 N. This state was held for 3 minutes and then the load was removed.

In the process of returning the test piece to its original shape from immediately after the removal of the load, the time for the entire part of the bent half of the test piece to pass the vertical straight line was measured and the shape retainability of the foam body (A) was evaluated based on the following standards.
- ◯◯: The bent state (bending angle in a range of 0° to 90°) was maintained for 1 minute or longer.
- ◯: The bent state (bending angle in a range of 0° to 90°) was maintained for 30 seconds or more and shorter than 1 minute.
- Δ: The bent state (bending angle in a range of 0° to 90°) was maintained for 1 second or longer and shorter than 30 seconds.
- X: The bent state (bending angle in a range of 0° to 90°) was not able to be maintained for 1 second or longer and returned to the original shape immediately.

(5) Evaluation 1 of Shape Followability of Foam Body (A)

A footwear insole was prepared using the obtained foam body (A) and placed in a shoe. Next, the obtained shoe was put on for 30 minutes and then the footwear insole was removed.

Next, the shape of the footwear insole was observed and the shape followability of the foam body (A) was evaluated based on the following standards.
- ◯: The footwear insole followed the solid shape of the sole and was deformed.
- X: The footwear insole was not deformed.

(6) Evaluation 2 of Shape Followability of Foam Body (A)

A pressure support was prepared using the obtained foam body (A) and the obtained pressure support was tightened on the calf of the leg. Next, the shape followability of the foam body (A) was evaluated based on the following standards.
- ◯: The pressure support gradually followed the shape of the calf immediately after being tightened on the calf, and finally, a feeling of the entire calf being tightened uniformly was given.
- X: The pressure support was maintained in a state of being first tightened on the calf and did not follow the shape of the calf, and a feeling of the entire calf being tightened uniformly was not given.

(7) Intrinsic Viscosity [η] of 4-Methyl-1-Pentene-Based Polymer

The intrinsic viscosity [η] was measured at 135° C. using a decalin solvent.

(8) Composition of 4-Methyl-1-Pentene-Based Polymer

The contents of 4-methyl-1-pentene and α-olefin in the 4-methyl-1-pentene-based polymer were quantitatively determined from $^{13}$C-NMR.

(9) Density of 4-Methyl-1-Pentene-Based Polymer

The density of the 4-methyl-1-pentene was calculated from the weight of each sample measured in water and air using an electronic densimeter MD-300S manufactured by ALFA MIRAGE Co., Ltd., according to ASTM D 1505 (water substitution method).

2. Raw Materials

The raw materials used in Examples and Comparative Examples are shown below.

(1) 4-Methyl-1-Pentene-Based Polymer (a1)

4-Methyl-1-pentene-based polymer 1: a copolymer of 4-methyl-1-pentene and propylene (content of constitutional unit derived from 4-methyl-1-pentene: 72 mol %, content of constitutional unit derived from propylene: 28 mol %, intrinsic viscosity [η] in decalin at 135° C.: 1.5 dL/g, density measured according to ASTM D 1505 (water substitution method): 0.84 g/cm$^3$)

4-Methyl-1-pentene-based polymer 2: a copolymer of 4-methyl-1-pentene and propylene (content of constitutional unit derived from 4-methyl-1-pentene: 85 mol %, content of constitutional unit derived from propylene: 15 mol %, intrinsic viscosity [η] in decalin at 135° C.: 1.4 dL/g, density measured according to ASTM D 1505 (water substitution method): 0.84 g/cm$^3$)

(2) Partially Crosslinkable Olefin-Based Elastomer

Density: 0.88 g/cm$^3$, MILASTOMER 4010N, manufactured by Mitsui Chemical Co., Ltd.

(3) Foamable Modified Resin

Foamable modified resin 1: styrene-based elastomer (density: 0.90 g/cm$^3$, SEBS, KratonG1657MS, manufactured by Kraton Polymer Japan Ltd.)

Foamable modified resin 2: maleic acid anhydride-modified styrene-based elastomer (density: 0.90 g/cm$^3$, TUFTEC M1943, manufactured by Asahi Kasei Corporation)

Foamable modified resin 3: thermoplastic polyamide-based resin (density: 1.01 g/cm$^3$, polyether block amide copolymer, PEBAX 2533 (SA01), manufactured by Arkema group)

Foamable modified resin 4: polypropylene (density: 0.91 g/cm$^3$, propylene homopolymer, VP103W, manufactured by Prime Polymer Co., Ltd.)

Foamable modified resin 5: acrylic acid-modified polytetrafluoroethylene (density: 1.2 g/cm$^3$, METABLEN A-3000, manufactured by MITSUBISHI RAYON Co., Ltd.)

Foamable modified resin 6: low density polyethylene (density: 0.92 g/cm$^3$, NOVATEC LD YF30, manufactured by Japan polyethylene Corporation)

(4) Foaming Agent

Foaming agent 1: sodium bicarbonate sodium citrate (P-4, manufactured by Otsuka Chemical Co., Ltd.)

Examples 1 to 21

As a molding machine, an apparatus including a single screw extrusion molding machine (cylinder inner diameter D: 50 mm, full flight screw, when the screw effective length is L, L/D: 32 mm, carbon dioxide supply position: 17.5 D from screw supply part side), a T-die (die width: 320 mm, lip opening: 0.5 to 1.8 mm), a cooling roll (outer diameter: 50 mm, formed of steel subjected to mirror surface finish hard chrome plating surface treatment, water cooling type), a carbon dioxide supply device, a cooling roll, and a taking-over machine was used.

First, each raw material was dry-blended with formulation shown in Tables 1A and 2A (the unit in the tables is parts by mass) respectively, the obtained mixture was put into a hopper, and carbon dioxide was injected into the middle (position: 17.5 D) of the cylinder of the extrusion molding machine from the carbon dioxide supply device at a pressure of 10 to 23 MPa. At this time, the amount of carbon dioxide injected was adjusted to 0.1% to 0.8% by mass with respect to the extrusion amount. Each component material was melted and kneaded under the conditions of temperature of 100° C. to 230° C. at each part of the cylinder and a screw rotation speed of 20 to 36 rpm, and the mixture was extruded from the T-die such that the extrusion amount was 5 to 8.5 kg/hour at a resin temperature of 130° C. to 195° C. in the cylinder head part. The extruded foam sheet was cooled by the cooling roll (water temperature flowing in the roll: 30° C.), and was taken over using the taking-over machine (taking-over speed: 0.4 to 2.3 m/min) to obtain foam bodies A1 to A21 having a sheet width of about 300 mm respectively.

Each evaluation was performed on the obtained foam bodies A1 to A21. The obtained results are shown in Tables 1A and 2A respectively.

Comparative Examples 1 and 2

As a molding machine, an apparatus including a single screw extrusion molding machine (cylinder inner diameter D: 50 mm, full flight screw, when the screw effective length is L, L/D: 32 mm), a T-die (die width: 320 mm, lip opening: 0.5 mm), a cooling roll (outer diameter: 50 mm, formed of steel subjected to mirror surface finish hard chrome plating surface treatment, water cooling type), a cooling roll, and a taking-over machine, which is the same as the molding machine in Examples 1 to 21 except not using the carbon dioxide supply device, was used.

First, each raw material was dry-blended with formulation shown in Table 2A (the unit in the table is parts by mass) respectively, and the obtained mixture was put into a hopper. Each component material was melted and kneaded under the conditions of temperature of 100° C. to 180° C. at each part of the cylinder and a screw rotation speed of 20 rpm, and the mixture was extruded from the T-die such that the extrusion amount was 6 to 7 kg/hour at a resin temperature of 182° C. to 185° C. in the cylinder head part. The extruded foam sheet was cooled by the cooling roll (water temperature flowing in the roll: 30° C.), and was taken over using the taking-over machine to obtain molded bodies 22 and 23 respectively.

Each evaluation was performed on the obtained molded bodies 22 and 23. The obtained results are shown in Table 2A respectively.

The molded bodies of Comparative Examples 1 and 2 had poor flexibility and thus the evaluation of shape retainability and shape followability was not performed.

Comparative Example 3

As a molding machine, an apparatus including a single screw extrusion molding machine (cylinder inner diameter D: 50 mm, full flight screw, when the screw effective length is L, L/D: 32 mm), a T-die (die width: 320 mm), a cooling roll (outer diameter: 50 mm, formed of steel subjected to mirror surface finish hard chrome plating surface treatment, water cooling type), a carbon dioxide supply device, a cooling roll, and a taking-over machine, which is the same as the molding machine in Examples 1 to 21 except that the lip opening is set to 1.05 mm, was used.

First, each raw material was dry-blended with formulation shown in Table 2A (the unit in the table is parts by mass) respectively, and the obtained mixture was put into a hopper. Each component material was melted and kneaded under the conditions of temperature of 180° C. to 200° C. at each part of the cylinder and a screw rotation speed of 42 rpm, and the mixture was extruded from the T-die such that the extrusion amount was 11 kg/hour at a resin temperature of 207° C. in the cylinder head part. The extruded foam sheet was cooled by the cooling roll (water temperature flowing in the roll: 30° C.), and was taken over using the taking-over machine to obtain a foam body 24.

Each evaluation was performed on the obtained foam body 24. The obtained results are shown in Table 2A.

Comparative Example 4

A foam body 25 (polyethylene-based foam sheet, HI-SHEET, manufactured by Mistui Mitsui Chemicals, Inc.) was used and subjected to each evaluation. The obtained results are shown in Table 2A.

TABLE 1A

| | Raw material | Example 1 | Example 2 | Example 3 | Example 4 | Example 5 | Example 6 |
|---|---|---|---|---|---|---|---|
| Composition [Parts by mass] | 4-Methyl-1-pentene-based polymer 1 | 100 | 90 | 90 | 85 | 90 | 80 |
| | 4-Methyl-1-pentene-based polymer 2 | | | | | | |
| | Foamable modified resin 1 | | | 5 | 5 | | |
| | Foamable modified resin 2 | | | | | 10 | 20 |

TABLE 1A-continued

|  | Raw material | Example 1 | Example 2 | Example 3 | Example 4 | Example 5 | Example 6 |
|---|---|---|---|---|---|---|---|
|  | Foamable modified resin 3 |  |  |  |  |  |  |
|  | Foamable modified resin 4 |  | 10 | 5 | 10 |  |  |
|  | Foamable modified resin 5 |  |  |  |  |  |  |
|  | Foamable modified resin 6 |  |  |  |  |  |  |
| Evaluation result | Foaming agent 1 | 0.3 | 0.3 | 0.3 | 0.3 | 0.3 | 0.3 |
|  | Density of sheet [g/cm³] | 0.53 | 0.48 | 0.47 | 0.49 | 0.51 | 0.52 |
|  | Thickness of sheet [mm] | 1.0 | 1.6 | 1.6 | 1.6 | 0.9 | 0.8 |
|  | Temperature showing maximum value of tan δ [° C.] | 27 | 27 | 28 | 28 | 28 | 27 |
|  | Maximum value of tan δ | 2.3 | 1.5 | 1.5 | 1.3 | 2.3 | 2.2 |
|  | Flexibility | ○ | ○ | ○ | ○ | ○ | ○ |
|  | Shape retainability | ○○ | ○○ | ○○ | ○○ | ○○ | ○○ |
|  | Shape followability 1 | ○ | ○ | ○ | ○ | ○ | ○ |
|  | Shape followability 2 | ○ | ○ | ○ | ○ | ○ | ○ |

|  | Raw material | Example 7 | Example 8 | Example 9 | Example 10 | Example 11 | Example 12 |
|---|---|---|---|---|---|---|---|
| Composition [Parts by mass] | 4-Methyl-1-pentene-based polymer 1 | 70 | 90 | 85 | 100 | 100 | 100 |
|  | 4-Methyl-1-pentene-based polymer 2 |  |  |  |  |  |  |
|  | Foamable modified resin 1 |  |  |  |  |  |  |
|  | Foamable modified resin 2 | 30 |  | 5 |  |  |  |
|  | Foamable modified resin 3 |  | 10 | 10 |  |  |  |
|  | Foamable modified resin 4 |  |  |  |  |  |  |
|  | Foamable modified resin 5 |  |  |  | 1 | 3 | 4 |
|  | Foamable modified resin 6 |  |  |  |  |  |  |
| Evaluation result | Foaming agent 1 | 0.3 | 0.3 | 0.3 | 0.3 | 0.3 | 0.3 |
|  | Density of sheet [g/cm³] | 0.55 | 0.51 | 0.59 | 0.53 | 0.54 | 0.56 |
|  | Thickness of sheet [mm] | 1.2 | 0.9 | 1.0 | 1.1 | 1.2 | 1.3 |
|  | Temperature showing maximum value of tan δ [° C.] | 27 | 27 | 28 | 29 | 29 | 28 |
|  | Maximum value of tan δ | 1.9 | 2.0 | 2.3 | 2.6 | 2.1 | 1.9 |
|  | Flexibility | ○ | ○ | ○ | ○ | ○ | ○ |
|  | Shape retainability | ○ | ○○ | ○○ | ○○ | ○○ | ○○ |
|  | Shape followability 1 | ○ | ○ | ○ | ○ | ○ | ○ |
|  | Shape followability 2 | ○ | ○ | ○ | ○ | ○ | ○ |

TABLE 2A

|  | Raw material | Example 13 | Example 14 | Example 15 | Example 16 | Example 17 | Example 19 | Example 20 |
|---|---|---|---|---|---|---|---|---|
| Composition [Parts by mass] | 4-Methyl-1-pentene-based polymer 1 | 100 | 80 | 90 | 80 | 85 | 90 |  |
|  | 4-Methyl-1-pentene-based polymer 2 |  |  |  |  |  |  | 100 |
|  | Partially crosslinkable olefin-based elastomer |  |  |  |  |  |  |  |
|  | Foamable modified resin 1 |  | 20 |  |  |  |  |  |
|  | Foamable modified resin 2 |  |  | 10 | 20 | 5 |  |  |
|  | Foamable modified resin 3 |  |  |  |  | 10 |  |  |
|  | Foamable modified resin 4 |  |  |  |  |  |  |  |
|  | Foamable modified resin 5 | 5 | 3 | 3 | 3 | 3 |  |  |
|  | Foamable modified resin 6 |  |  |  |  |  | 10 |  |
| Evaluation result | Foaming agent 1 | 0.3 | 0.3 | 0.3 | 0.3 | 0.3 | 0.3 | 0.3 |
|  | Density of sheet [g/cm³] | 0.55 | 0.43 | 0.50 | 0.49 | 0.51 | 0.61 | 0.60 |
|  | Thickness of sheet [mm] | 2.0 | 2.5 | 1.7 | 1.6 | 1.8 | 1.6 | 1.1 |
|  | Temperature showing maximum value of tan δ [° C.] | 29 | 29 | 27 | 28 | 28 | 28 | 47 |
|  | Maximum value of tan δ | 2.2 | 2.0 | 1.9 | 1.8 | 1.8 | 1.9 | 0.8 |
|  | Flexibility | ○ | ○ | ○ | ○ | ○ | ○ | ○ |
|  | Shape retainability | ○○ | ○ | ○○ | ○ | ○○ | ○ | ○○ |
|  | Shape followability 1 | ○ | ○ | ○ | ○ | ○ | ○ | ○ |
|  | Shape followability 2 | ○ | ○ | ○ | ○ | ○ | ○ | ○ |

|  | Raw material | Example 21 | Comparative Example 1 | Comparative Example 2 | Comparative Example 3 | Comparative Example 4 |
|---|---|---|---|---|---|---|
| Composition [Parts by mass] | 4-Methyl-1-pentene-based polymer 1 | 50 | 100 | 100 |  | Polyethylene-based foam sheet |
|  | 4-Methyl-1-pentene-based polymer 2 | 50 |  |  |  |  |
|  | Partially crosslinkable olefin-based elastomer |  |  |  | 90 |  |
|  | Foamable modified resin 1 |  |  |  |  |  |
|  | Foamable modified resin 2 |  |  |  |  |  |
|  | Foamable modified resin 3 |  |  |  |  |  |

TABLE 2A-continued

|  |  |  |  |  |  |  |
|---|---|---|---|---|---|---|
|  | Foamable modified resin 4 |  |  |  | 10 |  |
|  | Foamable modified resin 5 |  |  | 3 |  |  |
|  | Foamable modified resin 6 |  |  |  |  |  |
|  | Foaming agent 1 | 0.3 | 0 | 0.3 | 0.3 |  |
| Evaluation | Density of sheet [g/cm³] | 0.50 | 0.84 | 0.84 | 0.41 | 0.33 |
| result | Thickness of sheet [mm] | 1.1 | 2.1 | 2.8 | 1.7 | 1.7 |
|  | Temperature showing maximum value of tan δ [° C.] | 35 | 29 | 31 | None | None |
|  | Maximum value of tan δ | 1.3 | 2.6 | 2.1 | None | None |
|  | Flexibility | ○ | x | x | ○ | ○ |
|  | Shape retainability | ○○ | — | — | x | x |
|  | Shape followability 1 | ○ | — | — | x | x |
|  | Shape followability 2 | ○ | — | — | x | x |

As clearly seen from Tables 1A and 2A, it was found that the foam bodies (A) of Examples in which one or more temperatures showing the maximum value of loss tangent (tan δ) of dynamic viscoelasticity exist in at least a range of 10° C. or higher and 100° C. or lower, and the maximum value of the loss tangent was 0.8 or more and 3.5 or less were excellent in performance balance of flexibility, shape retainability, and shape followability.

On the other hand, the molded bodies of Comparative Examples 1 and 2 were inferior in flexibility. In addition, the foam bodies of Comparative Examples 3 and 4 were excellent in flexibility but inferior in shape retainability and shape followability.

EXAMPLES AND COMPARATIVE EXAMPLES ACCORDING TO SECOND INVENTION

Hereinafter, the second invention will be specifically described based on examples, but the second invention is not limited to these examples.

1. Measurement Method (1) Density of Polyolefin-Based Foam Sheet

A test piece was cut out from the polyolefin-based foam sheet and the test piece mass (g) was divided the by volume (cm³) obtained from the outer dimension of the test piece to obtain density.

(2) Shore A Hardness of Polyolefin-Based Foam Sheet Surface

The Shore A hardness was measured at 23° C. according to JIS K 6253 except that a test piece in which a plurality of the same kind of polyolefin-based foam sheets were overlapped with each other and the total thickness thereof was adjusted to be in a range of 7 mm or more and 30 mm or less was used. Here, the Shore A hardness ($HS_0$) is a Shore A hardness value immediately after the starting of needle contact and the Shore A hardness ($HS_1$) is a Shore A hardness value 15 seconds after the starting of needle contact.

The measurement was performed 5 times and the average value was adopted.

In addition, in the case of the Shore A hardness measurement, the fact that the minimum value of the total thickness by lamination of the sheets was set to 7 mm was based on the confirmation that, as a result of conducting investigations of the dependence of the total thickness of the overlapped sheets on the Shore A hardness by the present inventors in advance, as long as the total thickness of the sheets is 7 mm or more, the Shore A hardness is almost constant. In the case where the single sheet thickness is 7 mm or more, it is not necessary to measure the thickness by overlapping the sheets and the Shore A hardness of the single sheet is measured.

(3) Melt Tension of Polyolefin-Based Foam Sheet

The melt tension of the polyolefin-based foam sheet at 180° C. was measured using a capillary rheometer (CAPIROGRAPH, manufactured by Toyo Seiki Kogyo Co., Ltd.) and a capillary having a circular cross section (flow path length: 8 mm, flow path cross section inner diameter: 2.095 mm, inflow angle: 180°). First, a sample was poured into a barrel of a cylindrical reactor and melted at 180° C. for 6 minutes and then pushed out by a piston at a constant rate of 15 mm/min. Next, the molten strand that came out through the capillary was hooked on a pulley with a load cell (retention pulley) and pulled at a constant speed of 15 m/min by the take-off machine. At this time, the force on the load cell of the pulley was defined as the melt tension.

(4) Maximum Peak Height (Rp) of Polyolefin-Based Foam Sheet Surface

The measurement was carried out according to JIS B0601:2001 using a one-shot 3D shape measuring instrument (VR3000, manufactured by Keyence Corporation). Here, the evaluation length was 6 mm.

(5) Dynamic Viscoelasticity Measurement

The polyolefin-based foam sheet was cut into a test piece having a size of 30=length×10=width. Next, the temperature dependence of dynamic viscoelasticity was measured using MC301 manufactured by Anton Paar GmbH under the conditions of a frequency of 10 rad/sec, a temperature increase rate of 4° C./min, and a measurement temperature range of 0° C. to 50° C., and the temperature indicating the maximum value of the loss tangent (tan δ) due to the glass transition point in the temperature range and the maximum value of tan δ were determined.

(6) Blocking Properties of Polyolefin-Based Foam Sheet

The blocking properties of polyolefin-based foam sheet were evaluated by the following method.

First, the polyolefin-based foam sheet was cut into a strip having a size of 200 mm length×50 mm width. Next, the strip was cut into two test pieces having the same length as each other in the longitudinal direction and the front and back surfaces of the strips were overlapped with each other. A part (50 mm length×50 mm width) corresponding to a half of the area of the two overlapped test pieces (100 mm length×50 mm width) was sandwiched between two brass flat plates from the vertical direction, and a weight was placed on the brass flat plates so that the total load (including the weight of one upper brass flat plate) was 19.6 N. Next, the brass flat plates were left to stand in an environment of 23° C. for 3 hours. Thereafter, the load was removed and the brass flat plates were left to stand for 30 minutes.

Next, a round bar fixed in the horizontal direction (a round bar in which a glass cloth adhesive tape (thickness of 80 μm) impregnated with polytetrafluoroethylene was attached to a stainless steel tube with an outer diameter of 6 mm) was placed into the gap in the part where the front and back surfaces of the test pieces were overlapped with each other, the test pieces were pulled in the direction perpendicular to the round bar under the following conditions using a tensile tester, the front and back surfaces of the test pieces were peeled off, and a blocking force (=peeling force (N)/test piece width (50 mm)) was measured. Here, the initial value of the load when the front and back surfaces of the test pieces were peeled off was set to a peeling force (N).

Test piece: 100 mm length×50 mm width
Test temperature: 23° C.
Drawing speed: 50 mm/min Based on the obtained blocking force, the blocking properties of the polyolefin-based foam sheet were evaluated based on the following standards.

○○: The blocking force is less than 10 N/50 mm.
○: The blocking force is 10 N/50 mm or more and less than 30 N/50 mm.
Δ: The blocking force is 30 N/50 mm or more and less than 60 N/50 mm.
X: The blocking force is 60 N/50 mm or more.

(7) Surface Touch Feeling of Polyolefin-Based Foam Sheet

The surface touch feeling of the polyolefin-based foam sheet was evaluated based on the following standards.

○: The polyolefin-based foam sheet surface is soft and smooth, and the surface touch feeling is good.
X: The polyolefin-based foam sheet surface is soft but is rough and the surface touch feeling is poor.
XX: The polyolefin-based foam sheet surface is hard and smoothness is poor.

(8) Evaluation of Flexibility of Polyolefin-Based Foam Sheet

The polyolefin-based foam sheet was cut into a strip having a size of 100 mm length×20 mm width and the strip was used as a test piece. The test piece was bent at the center of the test piece so as to hold a state in which the test piece was in contact with the upper and lower surfaces of a brass flat plate 1 (100 mm×100 mm×1 mm thickness) on a horizontal surface under an environment of 23° C. Next, a brass flat plate 2 (50 mm×50 mm×1 mm thickness) was overlapped with the brass flat plate immediately, and a weight was placed on the test piece so that the total load was 1 kgf. This state was held for 3 minutes and then the load was removed.

Next, the flexibility of the polyolefin-based foam sheet was evaluated based on the following standards.

○: No whitening, crevices or cracks was visually observed in the bent part.
X: Whitening, crevices or cracks was easily visually observed in the bent part.

(9) Evaluation of Shape Retainability of Polyolefin-Based Foam Sheet

The polyolefin-based foam sheet was cut into a strip having a size of 100 mm length×20 mm width and the strip was used as a test piece. The test piece was bent at the center of the test piece so as to hold a state in which the test piece was in contact with the upper and lower surfaces of a brass flat plate 1 (100 mm×100 mm×1 mm thickness) on a horizontal surface under an environment of 23° C. Next, a brass flat plate 2 (50 mm×50 mm×1 mm thickness) was overlapped with the brass flat plate 1 immediately, and a weight was placed on the test piece so that the total load was 9.8 N. This state was held for 3 minutes and then the load was removed.

In the process of returning the test piece to its original shape from immediately after the removal of the load, the time for the entire part of the bent half of the test piece to pass the vertical straight line was measured and the shape retainability of the polyolefin-based foam sheet was evaluated based on the following standards.

○○: The bent state (bending angle in a range of 0° to 90°) was maintained for 1 minute or longer.
○: The bent state (bending angle in a range of 0° to 90°) was maintained for 30 seconds or more and shorter than 1 minute.
Δ: The bent state (bending angle in a range of 0° to 90°) was maintained for 1 second or longer and shorter than 30 seconds.
X: The bent state (bending angle in a range of 0° to 90°) was not able to be maintained for 1 second or longer and returned to the original shape immediately.

(10) Evaluation of Shape Followability of Polyolefin-Based Foam Sheet

A footwear insole was prepared using the obtained polyolefin-based foam sheet and placed in a shoe. Next, the obtained shoe was put on for 30 minutes and then the footwear insole was removed.

Next, the shape of the footwear insole was observed and the shape followability of the polyolefin-based foam sheet was evaluated based on the following standards.

○: The footwear insole followed the solid shape of the sole and was deformed.
X: The footwear insole was not deformed.

(11) Intrinsic Viscosity [η] of 4-Methyl-1-Pentene-Based Polymer

The intrinsic viscosity [η] was measured at 135° C. using a decalin solvent.

(12) Composition of 4-Methyl-1-Pentene-Based Polymer

The contents of 4-methyl-1-pentene and α-olefin in the 4-methyl-1-pentene-based polymer were quantitatively determined from $^{13}$C-NMR.

(13) Density of 4-Methyl-1-Pentene-Based Polymer

The density of the 4-methyl-1-pentene was calculated from the weight of each sample measured in water and air using an electronic densimeter MD-300S manufactured by ALFA MIRAGE Co., Ltd., according to ASTM D 1505 (water substitution).

2. Raw Materials

The raw materials used in Examples and Comparative Examples are shown below.

(1) 4-Methyl-1-Pentene-Based Polymer

4-Methyl-1-pentene-based polymer 1: a copolymer of 4-methyl-1-pentene and propylene (content of constitutional unit derived from 4-methyl-1-pentene: 72 mol %, content of constitutional unit derived from propylene: 28 mol %, intrinsic viscosity [η]: 1.5 dL/g, density: 0.84 g/cm$^3$)

(2) Partially Crosslinkable Olefin-Based Elastomer

Density: 0.88 g/cm$^3$, MILASTOMER 4010N, manufactured by Mitsui Chemical Co., Ltd.

(3) Foamable Modified Resin

Foamable modified resin 1: styrene-based elastomer (density: 0.90 g/cm$^3$, SEBS, Kraton G1657MS, manufactured by Kraton Polymer Japan Ltd.)

Foamable modified resin 2: maleic acid anhydride-modified styrene-based elastomer (density: 0.90 g/cm$^3$, TUFTEC M1943, manufactured by Asahi Kasei Corporation)

Foamable modified resin 3: thermoplastic polyamide-based resin (density: 1.01 g/cm$^3$, polyether block amide copolymer, PEBAX 2533 (SA01), manufactured by Arkema group)

Foamable modified resin 4: polypropylene (density: 0.91 g/cm$^3$, propylene homopolymer, VP103W, manufactured by Prime Polymer Co., Ltd.)

Foamable modified resin 5: acrylic acid-modified polytetrafluoroethylene (density: 1.2 g/cm$^3$, METABLEN A-3000, manufactured by MITSUBISHI RAYON Co., Ltd.)

Foamable modified resin 6: low density polyethylene (density: 0.92 g/cm$^3$, NOVATEC LD YF30, manufactured by Japan polyethylene Corporation)

(4) Foaming Agent

Foaming agent 1: sodium bicarbonate sodium citrate (P-4, manufactured by Otsuka Chemical Co., Ltd.)

Examples 1 to 19

As a molding machine, an apparatus including a single screw extrusion molding machine (cylinder inner diameter D: 50 mm, full flight screw, when the screw effective length is L, L/D: 32 mm, carbon dioxide supply position: 17.5 D from screw supply part side), a T-die (die width: 320 mm, lip opening: 0.5 to 1.8 mm), a cooling roll (outer diameter: 50 mm, formed of steel subjected to mirror surface finish hard chrome plating surface treatment, water cooling type), a carbon dioxide supply device, a cooling roll, and a taking-over machine was used.

First, each raw material was dry-blended with formulation shown in Tables 1B and 2B (the unit in the tables is parts by mass) respectively, the obtained mixture was put into a hopper, and carbon dioxide was injected into the middle (position: 17.5 D) of the cylinder of the extrusion molding machine from the carbon dioxide supply device at a pressure of 10 to 23 MPa. At this time, the amount of carbon dioxide injected was adjusted to 0.1% to 0.8% by mass with respect to the extrusion amount. Each component material was melted and kneaded under the conditions of temperature of 100° C. to 230° C. at each part of the cylinder and a screw rotation speed of 20 to 36 rpm, and the mixture was extruded from the T-die such that the extrusion amount was 5 to 8.5 kg/hour at a resin temperature of 130° C. to 195° C. in the cylinder head part. The extruded foam sheet was cooled by the cooling roll (water temperature flowing in the roll: 30° C.), and was taken over using the taking-over machine (taking-over speed: 0.4 to 2.3 m/min) to obtain polyolefin-based foam sheets 1 to 19 having a sheet width of about 300 mm respectively.

Each evaluation was performed on the obtained polyolefin-based foam sheets 1 to 19. The obtained results are shown in Tables 1B and 2B.

Comparative Examples 1 and 2

As a molding machine, an apparatus including a single screw extrusion molding machine (cylinder inner diameter D: 50 mm, full flight screw, when the screw effective length is L, L/D: 32 mm), a T-die (die width: 320 mm, lip opening: 0.5 mm), a cooling roll (outer diameter: 50 mm, formed of steel subjected to mirror surface finish hard chrome plating surface treatment, water cooling type), a cooling roll, and a taking-over machine, which is the same as the molding machine in Examples 1 to 19 except not using the carbon dioxide supply device, was used.

First, each raw material was dry-blended with formulation shown in Table 2B (the unit in the table is parts by mass) respectively, and the obtained mixture was put into a hopper. Each component material was melted and kneaded under the conditions of temperature of 100° C. to 180° C. at each part of the cylinder and a screw rotation speed of 20 rpm, and the mixture was extruded from the T-die such that the extrusion amount was 6 to 7 kg/hour at a resin temperature of 182° C. to 185° C. in the cylinder head part. The extruded foam sheet was cooled by the cooling roll (water temperature flowing in the roll: 30° C.), and was taken over using the taking-over machine to obtain polyolefin-based sheets 20 and 21 respectively.

Each evaluation was performed on the obtained polyolefin-based sheets 20 and 21. The obtained results are shown in Table 2B respectively.

The polyolefin-based sheets of Comparative Examples 1 and 2 had hard surfaces, poor smoothness, and poor blocking properties, and thus the evaluation of flexibility, shape retainability, and shape followability was not performed.

Comparative Example 3

As a molding machine, an apparatus including a single screw extrusion molding machine (cylinder inner diameter D: 50 mm, full flight screw, when the screw effective length is L, L/D: 32 mm), a T-die (die width: 320 mm), a cooling roll (outer diameter: 50 mm, formed of steel subjected to mirror surface finish hard chrome plating surface treatment, water cooling type), a carbon dioxide supply device, a cooling roll, and a taking-over machine, which is the same as the molding machine in Examples 1 to 19 except that the lip opening is set to 1.05 mm, was used.

First, each raw material was dry-blended with formulation shown in Table 2B (the unit in the table is parts by mass) respectively, and the obtained mixture was put into a hopper. Each component material was melted and kneaded under the conditions of temperature of 180° C. to 200° C. at each part of the cylinder and a screw rotation speed of 42 rpm, and the mixture was extruded from the T-die such that the extrusion amount was 11 kg/hour at a resin temperature of 207° C. in the cylinder head part. The extruded foam sheet was cooled by the cooling roll (water temperature flowing in the roll: 30° C.), and was taken overusing the taking-over machine to obtain a polyolefin-based foam sheet 22.

Each evaluation was performed on the obtained polyolefin-based foam sheet 22. The obtained results are shown in Table 2B.

Comparative Example 4

A polyolefin-based foam sheet 23 (polyethylene-based foam sheet, HI-SHEET, manufactured by Mistui Mitsui Chemicals, Inc.) was used and subjected to each evaluation. The obtained results are shown in Table 2B.

TABLE 1B

| | Raw material | Example 1 | Example 2 | Example 3 | Example 4 | Example 5 | Example 6 | Example 7 |
|---|---|---|---|---|---|---|---|---|
| Composition [Parts by mass] | 4-Methyl-1-pentene-based polymer 1 | 100 | 90 | 90 | 85 | 90 | 80 | 70 |
| | Foamable modified resin 1 | | | 5 | 5 | | | |
| | Foamable modified resin 2 | | | | | 10 | 20 | 30 |
| | Foamable modified resin 3 | | | | | | | |
| | Foamable modified resin 4 | | 10 | 5 | 10 | | | |
| | Foamable modified resin 5 | | | | | | | |

TABLE 1B-continued

| | | | | | | | | |
|---|---|---|---|---|---|---|---|---|
| Evaluation result | Foamable modified resin 6 | | | | | | | |
| | Foaming agent 1 | 0.3 | 0.3 | 0.3 | 0.3 | 0.3 | 0.3 | 0.3 |
| | Melt tension [mN] | Not measured | 50 | Not measured | Not measured | Not measured | 48 | Not measured |
| | Density of sheet [g/cm³] | 0.53 | 0.48 | 0.47 | 0.49 | 0.51 | 0.52 | 0.55 |
| | Thickness of sheet [mm] | 1.0 | 1.6 | 1.6 | 1.6 | 0.9 | 0.8 | 1.2 |
| | Shore A hardness  HS$_0$ | 66 | 63 | 66 | 70 | 73 | 64 | 54 |
| | HS$_1$ | 24 | 29 | 25 | 35 | 22 | 20 | 19 |
| | ΔHS | 42 | 34 | 41 | 35 | 51 | 44 | 35 |
| | Maximum peak height (Rp) [μm] | 201 | 81 | 148 | 67 | 123 | 145 | 151 |
| | Temperature showing maximum value of tan δ [° C.] | 27 | 27 | 28 | 28 | 28 | 27 | 27 |
| | Maximum value of tan δ | 2.3 | 1.5 | 1.5 | 1.3 | 2.3 | 2.2 | 1.9 |
| | Blocking properties | ○○ | ○○ | ○○ | ○○ | ○○ | ○○ | ○○ |
| | Surface touch | x | ○ | ○ | ○ | ○ | ○ | ○ |
| | Flexibility | ○ | ○ | ○ | ○ | ○ | ○ | ○ |
| | Shape retainability | ○○ | ○○ | ○○ | ○○ | ○○ | ○○ | ○ |
| | Shape followability | ○ | ○ | ○ | ○ | ○ | ○ | ○ |

| | Raw material | Example 8 | Example 9 | Example 10 | Example 11 | Example 12 |
|---|---|---|---|---|---|---|
| Composition [Parts by mass] | 4-Methyl-1-pentene-based polymer 1 | 90 | 85 | 100 | 100 | 100 |
| | Foamable modified resin 1 | | | | | |
| | Foamable modified resin 2 | | 5 | | | |
| | Foamable modified resin 3 | 10 | 10 | | | |
| | Foamable modified resin 4 | | | | | |
| | Foamable modified resin 5 | | | 1 | 3 | 4 |
| | Foamable modified resin 6 | | | | | |
| | Foaming agent 1 | 0.3 | 0.3 | 0.3 | 0.3 | 0.3 |
| Evaluation result | Melt tension [mN] | Not measured | 22 | 41 | 195 | Not measured |
| | Density of sheet [g/cm³] | 0.51 | 0.59 | 0.53 | 0.54 | 0.56 |
| | Thickness of sheet [mm] | 0.9 | 1.0 | 1.1 | 1.2 | 1.3 |
| | Shore A hardness  HS$_0$ | 54 | 64 | 67 | 72 | 68 |
| | HS$_1$ | 16 | 21 | 22 | 26 | 24 |
| | ΔHS | 38 | 43 | 45 | 46 | 44 |
| | Maximum peak height (Rp) [μm] | 203 | 162 | 196 | 127 | 137 |
| | Temperature showing maximum value of tan δ [° C.] | 27 | 28 | 29 | 29 | 28 |
| | Maximum value of tan δ | 2.0 | 2.3 | 2.6 | 2.1 | 1.9 |
| | Blocking properties | ○○ | ○○ | ○○ | ○○ | ○○ |
| | Surface touch | x | ○ | x | ○ | ○ |
| | Flexibility | ○ | ○ | ○ | ○ | ○ |
| | Shape retainability | ○○ | ○○ | ○○ | ○○ | ○○ |
| | Shape followability | ○ | ○ | ○ | ○ | ○ |

TABLE 2B

| | Raw material | Example 13 | Example 14 | Example 15 | Example 16 | Example 17 | Example 18 |
|---|---|---|---|---|---|---|---|
| Composition [Parts by mass] | 4-Methyl-1-pentene-based polymer 1 | 100 | 80 | 90 | 80 | 85 | 65 |
| | Partially crosslinkable olefin-based elastomer | | | | | | |
| | Foamable modified resin 1 | | 20 | | | | |
| | Foamable modified resin 2 | | | 10 | 20 | 5 | 5 |
| | Foamable modified resin 3 | | | | | 10 | 30 |
| | Foamable modified resin 4 | | | | | | |
| | Foamable modified resin 5 | 5 | 3 | 3 | 3 | 3 | 3 |
| | Foamable modified resin 6 | | | | | | |
| | Foaming agent 1 | 0.3 | 0.3 | 0.3 | 0.3 | 0.3 | 0.3 |
| Evaluation result | Melt tension [mN] | 110 | Not measured | Not measured | 320 | 240 | Not measured |
| | Density of sheet [g/cm³] | 0.55 | 0.43 | 0.50 | 0.49 | 0.51 | 0.54 |
| | Thickness of sheet [mm] | 2.0 | 2.5 | 1.7 | 1.6 | 1.8 | 2.2 |
| | Shore A hardness  HS$_0$ | 77 | 71 | 65 | 65 | 66 | 67 |
| | HS$_1$ | 29 | 22 | 18 | 19 | 23 | 29 |
| | ΔHS | 48 | 49 | 47 | 46 | 43 | 38 |
| | Maximum peak height (Rp) [μm] | 87 | 179 | 151 | 130 | 106 | 108 |
| | Temperature showing maximum value of tan δ [° C.] | 29 | 29 | 27 | 28 | 28 | 28 |
| | Maximum value of tan δ | 2.2 | 2.0 | 1.9 | 1.8 | 1.8 | 1.3 |
| | Blocking properties | ○○ | ○○ | ○○ | ○○ | ○○ | ○○ |

TABLE 2B-continued

|  |  |  |  |  |  |  |
|---|---|---|---|---|---|---|
| Surface touch | ○ | ○ | ○ | ○ | ○ | ○ |
| Flexibility | ○ | ○ | ○ | ○ | ○ | ○ |
| Shape retainability | ○○ | ○ | ○○ | ○ | ○○ | Δ |
| Shape followability | ○ | ○ | ○ | ○ | ○ | ○ |

| | Raw material | Example 19 | Comparative Example 1 | Comparative Example 2 | Comparative Example 3 | Comparative Example 4 |
|---|---|---|---|---|---|---|
| Composition [Parts by mass] | 4-Methyl-1-pentene-based polymer 1 | 90 | 100 | 100 | | Polyethylene-based foam sheet |
| | Partially crosslinkable olefin-based elastomer | | | | 90 | |
| | Foamable modified resin 1 | | | | | |
| | Foamable modified resin 2 | | | | | |
| | Foamable modified resin 3 | | | | | |
| | Foamable modified resin 4 | | | | 10 | |
| | Foamable modified resin 5 | | | 3 | | |
| | Foamable modified resin 6 | 10 | | | | |
| | Foaming agent 1 | 0.3 | 0 | 0.3 | 0.3 | |
| Evaluation result | Melt tension [mN] | 35 | Not measured | Not measured | Not measured | Not measured |
| | Density of sheet [g/cm$^3$] | 0.61 | 0.84 | 0.84 | 0.41 | 0.33 |
| | Thickness of sheet [mm] | 1.6 | 2.1 | 2.8 | 1.7 | 1.7 |
| | Shore A hardness  HS$_0$ | 68 | 86 | 91 | 37 | 64 |
| | HS$_1$ | 24 | 57 | 66 | 30 | 60 |
| | ΔHS | 44 | 29 | 25 | 7 | 4 |
| | Maximum peak height (Rp) [μm] | 240 | 19 | 27 | 24 | 43 |
| | Temperature showing maximum value of tan δ [° C.] | 28 | 29 | 31 | None | None |
| | Maximum value of tan δ | 1.9 | 2.6 | 2.1 | None | None |
| | Blocking properties | ○○ | X | X | ○○ | ○○ |
| | Surface touch | x | XX | XX | ○ | ○ |
| | Flexibility | ○ | — | — | ○ | ○ |
| | Shape retainability | ○ | — | — | X | X |
| | Shape followability | ○ | — | — | X | X |

As clearly seen from Tables 1B and 2B, it was found that the polyolefin-based foam sheets of Examples in which the ΔHS was 30 or more and 60 or less were excellent in performance balance of flexibility, shape retainability, and shape followability.

On the other hand, the polyolefin-based sheets of Comparative Examples 1 and 2 had hard surfaces, poor smoothness, and poor blocking properties. In addition, the polyolefin-based foam sheets of Comparative Examples 3 and 4 were excellent in flexibility but inferior in shape retainability and shape followability.

3. EXAMPLES AND COMPARATIVE EXAMPLES ACCORDING TO THIRD INVENTION

Hereinafter, the third invention will be specifically described based on examples, but the third invention is not limited to these examples.

1. Measurement Method (1) Evaluation of Sheet Cushioning Performance

Complex sheets of Examples and sheets of Comparative Examples were evaluated as sheet cushion materials.

In order to evaluate cushioning performance, the rebound resilience and the body pressure distribution shown below were measured in an environment at a temperature of 23° C. and a relative humidity of 50%.

[1] Rebound Resilience

The rebound resilience was measured according to the A method of test standards JIS K 6400:1997.

[2] Body Pressure Distribution

Each of the complex sheets of Examples and the sheets of Comparative Examples was placed on a chair as a sheet cushion material, the body pressure distribution of the seat face when a person was sitting was measured, and the body pressure dispersibility was evaluated respectively. The chair used in the measurement was a commercially available pipe chair (Folding Chair, item No. NFA-700-v, seat face size: seat width 405 mm×seat depth 402 mm×seat height 424 mm, manufactured by Fujisawa kougyo Co., Ltd.).

As the body pressure distribution measurement apparatus, a sheet type pressure distribution measuring instrument (model No. X3 PRO, manufactured by XSENSOR Technology Corporation) was used. Here, as the sensor sheet of the sheet type pressure distribution measuring instrument, a sensor sheet for sitting (having a size of 508 mm length×508 mm width and a sensor pitch of 12.7 mm) was used.

First, each of the sheet cushion materials of Examples or Comparative Examples was placed on the seat face of the pipe chair, and the sheet sensor of the sheet type pressure distribution measuring instrument was placed thereon. Next, on the upper surface of the pipe chair on which the sheet cushion material and the sensor sheet were placed, a male (height: 184 cm, weight: 82 kg) was seated quietly in a posture such that the angles of the heel, knee, and waist were 90 degrees. A body pressure distribution graph visually showing the pressure distribution on the seat face 1 minute after the stationary state immediately after being seated quietly as a color distribution was obtained. At this time, the highest peak pressure ($P_{max}$) (kPa) detected by the sensor sheet was also recorded.

Example 1

The cross sections of the plurality of foam bodies A1 used in Example 1 according to the first invention were subjected to butt welding by using a heated solder iron and then the sheet was cut out to obtain a flat square foam body sheet (A2) having a size of 390 mm length×390 mm width×1 mm thickness. Next, two foam body sheets (A2) were overlapped and bonded using a styrene·butadiene copolymer rubber (SBR)-based solvent adhesive to obtain a foam body sheet (A3) (size: 390 mm length×390 mm width×2 mm thickness). Further, one commercially available low rebound resilience urethane foam (B1) (apparent density: 39 kg/m$^3$, size: 390 mm length×390 mm width×50 mm thickness) was overlapped and bonded with one flat surface of the foam body sheet (A3) and as a sheet cushion material, a complex sheet (C1) (size: 390 mm length×390 mm width×52 mm thickness) was obtained.

As for the mechanical properties of the low rebound resilience urethane foam (B1) used, the hardness measured according to the D method of test standards JIS K6400-2:2012 (however, the speed of the pressure plate was set to 50 mm/min) in an environment at a temperature of 23° C. and a relative humidity of 50% was 72 (N) and the hysteresis ratio measured according to the E method of test standards JIS K6400-2:2012 was 51(%).

In evaluation of the sheet cushioning performance (rebound resilience, body pressure distribution), the complex sheet (C1) was handled as a sheet cushion material such that the foam body sheet (A3) side faced upward. Regarding the sheet cushioning performance of the complex sheet (C1), the rebound resilience and the peak pressure ($P_{max}$) in the body pressure distribution measurement are respectively shown in Table 1C.

Comparative Example 1

The sheet cushioning performance was evaluated in the same manner as in Example 1 of the third invention except that as a sheet cushion material, only one sheet of low rebound resilience urethane foam (B1) (size: 390 mm length×390 mm width×50 mm thickness) was used. Regarding the obtained sheet cushioning performance, rebound resilience and the peak pressure ($P_{max}$) in the body pressure distribution measurement are respectively shown in Table 1C.

From the comparison of the sheet cushioning performance of Example 1 and Comparative Example 1 of the third invention, it was determined that compared to Comparative Example 1 in which only the low rebound resilience urethane foam (B1) was used without using the foam body sheet (A3), in the complex sheet (C1) of Example 1 formed by combining the foam body sheet (A3) and the low rebound resilience urethane foam, the rebound resilience was low, the low rebound was improved, the peak pressure ($P_{max}$) of the seat face was low, and the body pressure dispersibility was excellent.

In addition, from a body pressure distribution graph (not shown) visually showing the pressure distribution on the seat face 1 minute after the stationary state immediately after being seated quietly as a color distribution, it could be confirmed that the pressure applied to the sheet cushion material was distributed in a case of the complex sheet (C1) of Example 1 compared to a case in which only the low rebound resilience urethane foam (B1) of Comparative Example 1 was used.

That is, it was found that the complex sheet (C1) of Example was excellent in performance balance of flexibility and shape followability.

TABLE 1C

| | | Unit | Example 1 | Comparative Example 1 |
|---|---|---|---|---|
| Constitution of sheet cushion material | | — | Complex sheet (C1): complex of foam body sheet (A3) and low rebound resilience urethane foam (B1) | Only low rebound resilience urethane foam (B1) |
| Sheet cushioning performance | Rebound resilience | % | 12 | 17 |
| | Peak pressure ($P_{max}$) | kPa | 21 | 25 |

This application claims priority based on Japanese Patent Application No. 2017-017820, filed on Feb. 2, 2017, and Japanese Patent Application No. 2017-219449, filed on Nov. 14, 2017, the entire disclosures of which are incorporated herein.

The invention claimed is:

1. A polyolefin-based uncrosslinked foam sheet comprising:
   70% by mass or more and 90% by mass or less of a 4-methyl-1-pentene-based polymer including a constitutional unit derived from 4-methyl-1-pentene (A1) and a constitutional unit derived from an α-olefin having 2 to 3 carbon atoms (A2), and
   5% by mass or more and 30% by mass or less of a foamable modified resin, wherein the foamable modified resin is at least one selected from the group consisting of thermoplastic polyamide-based resins, hydrogenated styrene-based elastomers, acrylic acid, methacrylic acid or maleic acid-modified thermoplastic polyamide-based resins and acrylic acid, methacrylic acid or maleic acid-modified hydrogenated styrene-based elastomers,
   wherein a maximum peak height (Rp) of at least one surface of the polyolefin-based uncrosslinked foam sheet, which is measured according to JIS B0601:2001, is 67 μm or more and 190 μm or less,
   wherein when a Shore A hardness of at least one surface of the polyolefin-based uncrosslinked foam sheet immediately after measurement, which is measured at 23° C. according to JIS K6253, is $HS_0$, and a Shore A hardness 15 seconds after the measurement is $HS_1$,
   ΔHS expressed by ($HS_0$–$HS_1$) is 30 or more and 60 or less; and
   $HS_0$ is 54 or more and 68 or less,
   wherein a total of the constitutional unit (A1) derived from the 4-methyl-1-pentene and the constitutional unit (A2) derived from the α-olefin having 2 to 3 carbon atoms is 100 mol %, a content of the constitutional unit (A1) is 72 mol % or more and 90 mol % or less and a content of the constitutional unit (A2) is 10 mol % or more and 28 mol % or less, and
   wherein one or more temperatures showing a maximum value of loss tangent (tan δ) of dynamic viscoelasticity of the polyolefin-based uncrosslinked foam sheet exist in at least a range of 10° C. or higher and 40° C. or lower, and the maximum value of the loss tangent is 0.8 or more and 3 or less.

2. The polyolefin-based uncrosslinked foam sheet according to claim 1,
   wherein a melt tension of the polyolefin-based uncrosslinked foam sheet at 180° C. is 10 mN or more and 1000 mN or less.

3. The polyolefin-based uncrosslinked foam sheet according to claim 1,
wherein a density of the polyolefin-based uncrosslinked foam sheet is 0.10 g/cm³ or more and 0.80 g/cm³ or less.

4. The polyolefin-based uncrosslinked foam sheet according to claim 1, which is used for a member that may come into direct or indirect contact with a human body surface when used.

5. An uncrosslinked foam body comprising:
70% by mass or more and 90% by mass or less of a 4-methyl-1-pentene-based polymer including a constitutional unit derived from 4-methyl-1-pentene (A1) and a constitutional unit derived from an α-olefin having 2 to 3 carbon atoms (A2), and
5% by mass or more and 30% by mass or less of a foamable modified resin, wherein the foamable modified resin is at least one selected from the group consisting of thermoplastic polyamide-based resins, hydrogenated styrene-based elastomers, acrylic acid, methacrylic acid or maleic acid-modified thermoplastic polyamide-based resins and acrylic acid, methacrylic acid or maleic acid-modified hydrogenated styrene-based elastomers,
wherein a maximum peak height (Rp) of at least one surface of the uncrosslinked foam body, which is measured according to JIS B0601:2001, is 67 μm or more and 190 μm or less, and
wherein one or more temperatures showing a maximum value of loss tangent (tan δ), which is obtained by dynamic viscoelasticity measurement conducted under conditions of a temperature increase rate of 4° C./min, a frequency of 1.59 Hz, and a distortion of 0.1%, exist in at least a range of 10° C. or higher and 40° C. or lower, and the maximum value of the loss tangent is 0.8 or more and 3.0 or less,
wherein the uncrosslinked foam body has a density of 0.10-0.80 g/cm3,
wherein a total of the constitutional unit (A1) derived from the 4-methyl-1-pentene and the constitutional unit (A2) derived from the α-olefin having 2 to 3 carbon atoms is 100 mol %, a content of the constitutional unit (A1) is 72 mol % or more and 90 mol % or less and a content of the constitutional unit (A2) is 10 mol % or more and 28 mol % or less, and
wherein when a Shore A hardness of at least one surface of the uncrosslinked foam body immediately after measurement, which is measured at 23° C. according to JIS K6253, is $HS_0$, and a Shore A hardness 15 seconds after the measurement is $HS_1$,
ΔHS expressed by ($HS_0-HS_1$) is 30 or more and 60 or less, and
$HS_0$ is 54 or more and 68 or less.

* * * * *